(12) United States Patent
Shannon

(10) Patent No.: US 9,738,407 B2
(45) Date of Patent: Aug. 22, 2017

(54) APPARATUSES AND METHODS FOR FILLING BAGS

(71) Applicant: Hope For Tomorrow, LLC, West Valley City, UT (US)

(72) Inventor: Rodrick G. Shannon, Tooele, UT (US)

(73) Assignee: Hope For Tomorrow, LLC, West Valley City, UT (US)

( * ) Notice: Subject to any disclaimer, the term of this patent is extended or adjusted under 35 U.S.C. 154(b) by 20 days.

(21) Appl. No.: 14/678,624

(22) Filed: Apr. 3, 2015

(65) Prior Publication Data

US 2015/0284124 A1 Oct. 8, 2015

Related U.S. Application Data

(60) Provisional application No. 61/975,618, filed on Apr. 4, 2014.

(51) Int. Cl.
*B65B 67/04* (2006.01)
*A01B 1/02* (2006.01)
*B65B 67/12* (2006.01)

(52) U.S. Cl.
CPC ............. *B65B 67/04* (2013.01); *A01B 1/022* (2013.01); *B65B 67/1238* (2013.01)

(58) Field of Classification Search
CPC ....... B65B 1/04; B65B 67/04; B65B 67/1205; B65B 67/1211; B65B 67/1238
USPC .......... 141/108, 109; 294/49, 53.5, 176, 178
See application file for complete search history.

(56) References Cited

U.S. PATENT DOCUMENTS

| | | | | |
|---|---|---|---|---|
| 1,599,307 A | * | 9/1926 | Ward | E03F 9/002 15/104.068 |
| 2,629,624 A | * | 2/1953 | Nelles | A01B 1/02 294/57 |
| 5,810,408 A | * | 9/1998 | Armstrong | A01B 1/00 16/422 |
| 7,946,637 B1 | * | 5/2011 | Gehman | E01H 5/02 294/51 |
| 9,205,936 B2 | * | 12/2015 | Shannon | B65B 1/04 |

* cited by examiner

*Primary Examiner* — Timothy L Maust
(74) *Attorney, Agent, or Firm* — Stoel Rives LLP

(57) ABSTRACT

Apparatuses and methods for filling bags are provided. Some apparatuses include a shovel and an elongate lever arm that may be arranged in a bagging or pivoting orientation, a storage orientation, and a shovel orientation. In the bagging orientation, the elongate lever arm may be rotatably coupled to the shovel. In the storage orientation, the apparatus may be configured for compact storage. In the shovel orientation, the elongate lever arm may extend proximally from the shovel to function as an extension of the shovel arm.

19 Claims, 15 Drawing Sheets

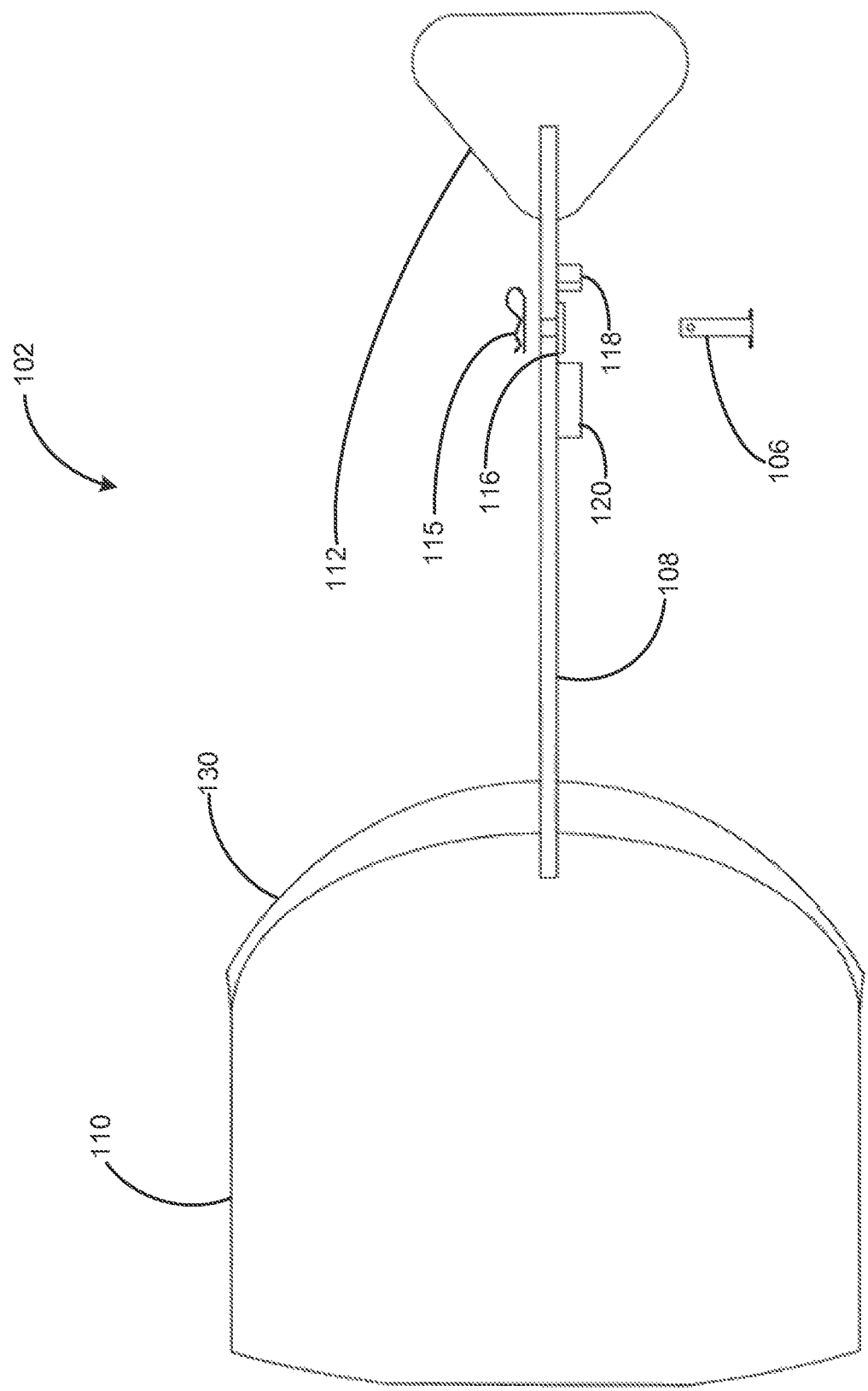

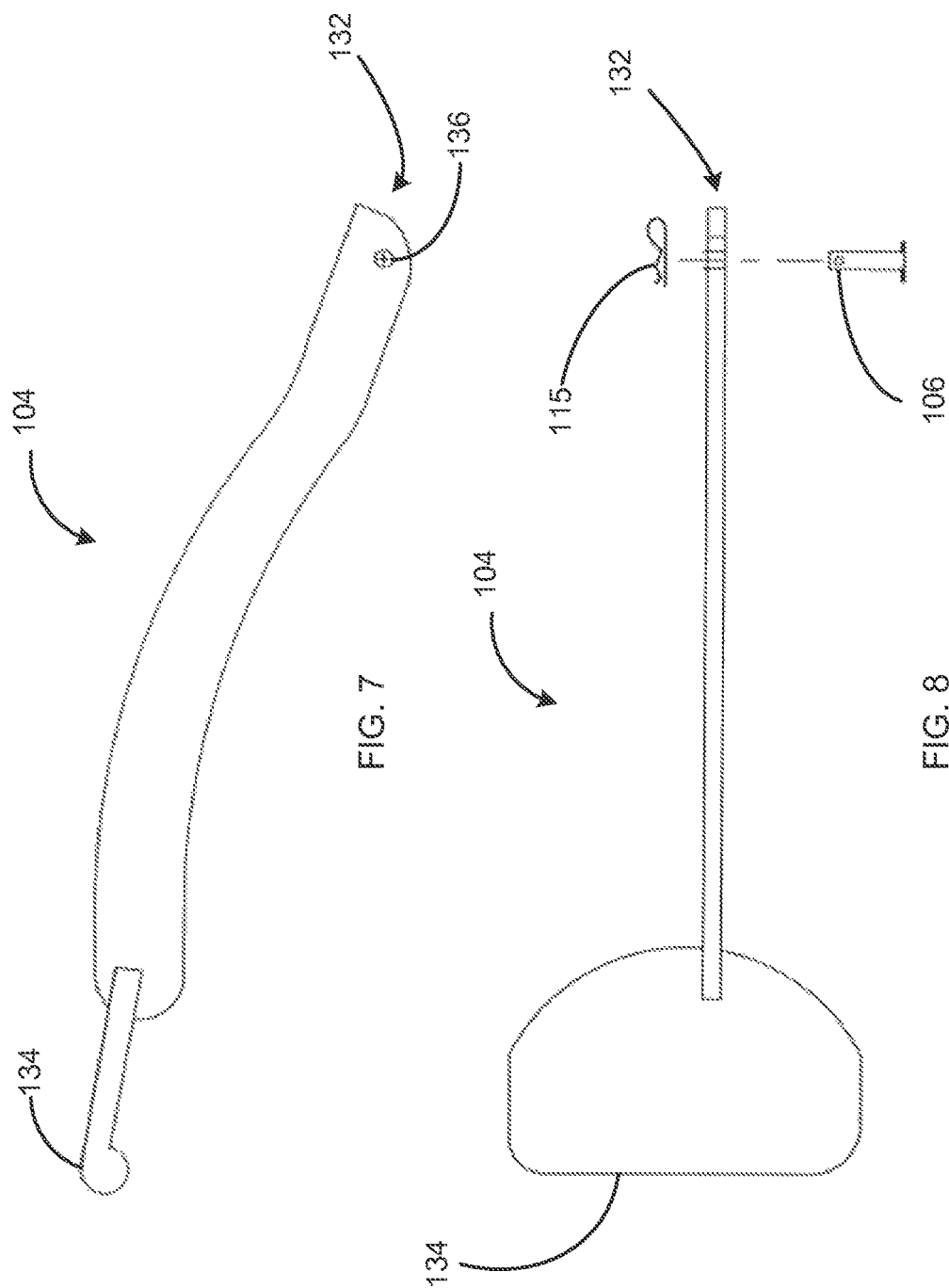

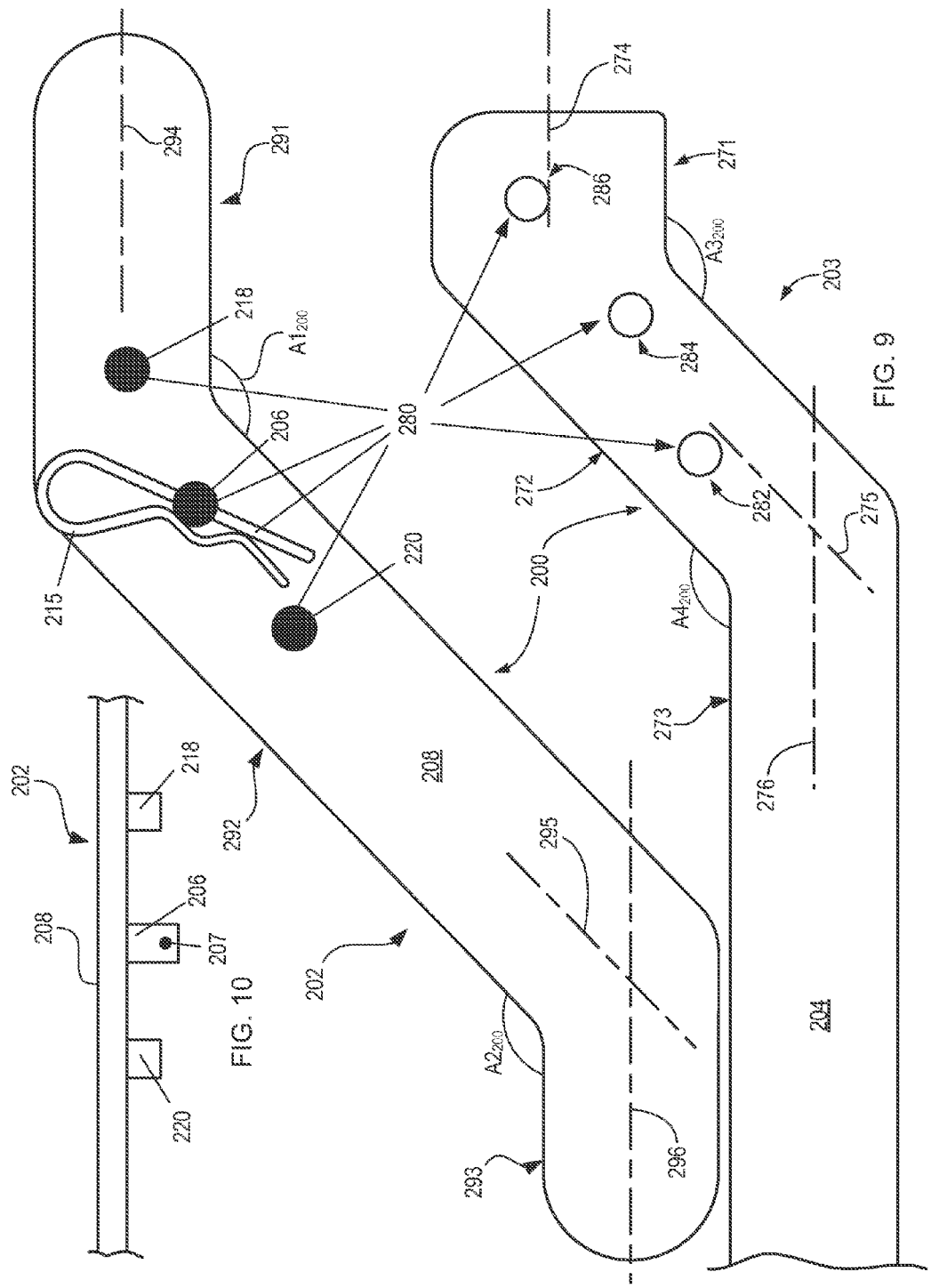

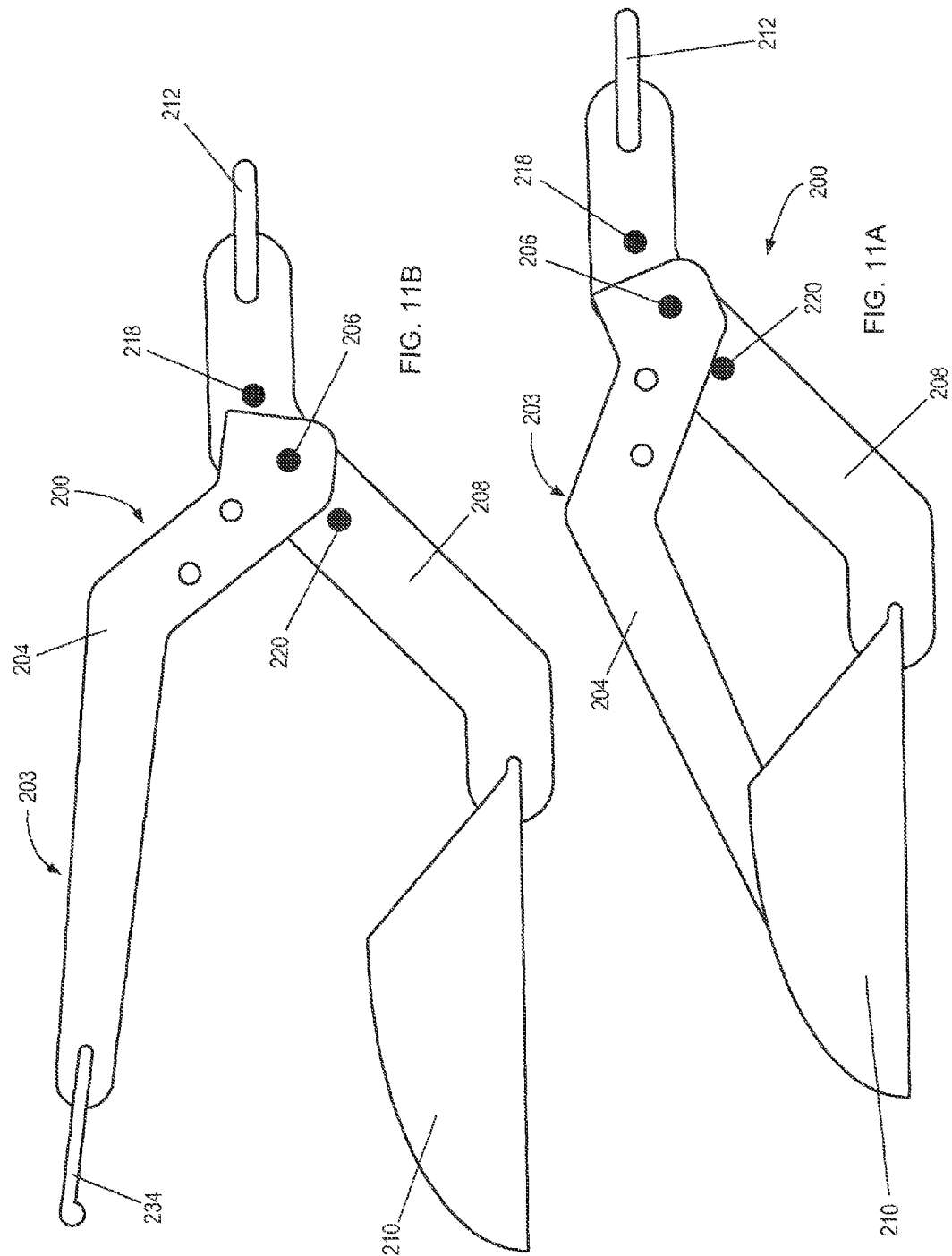

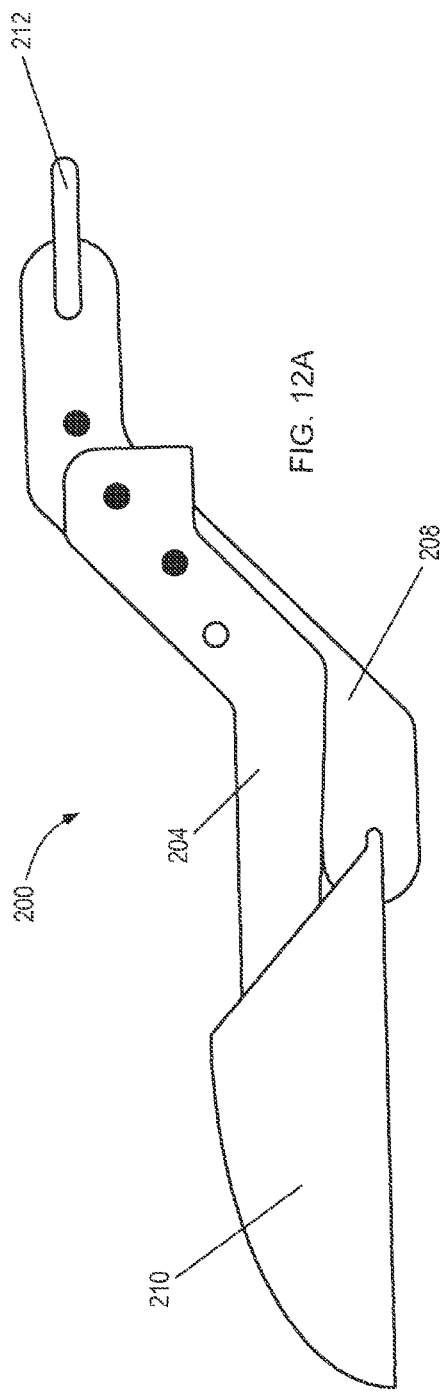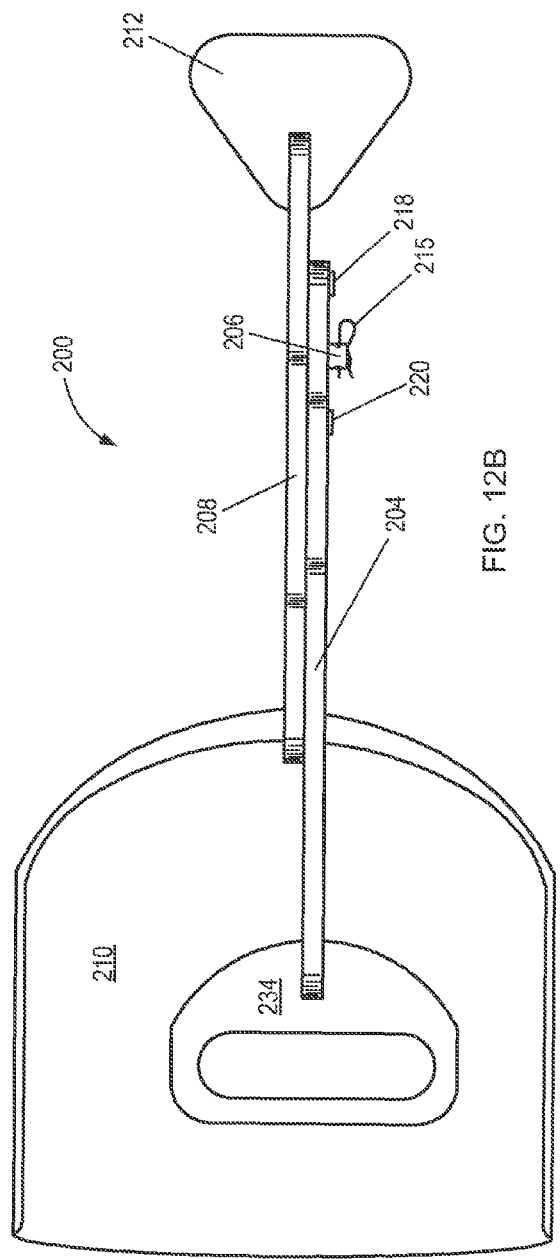

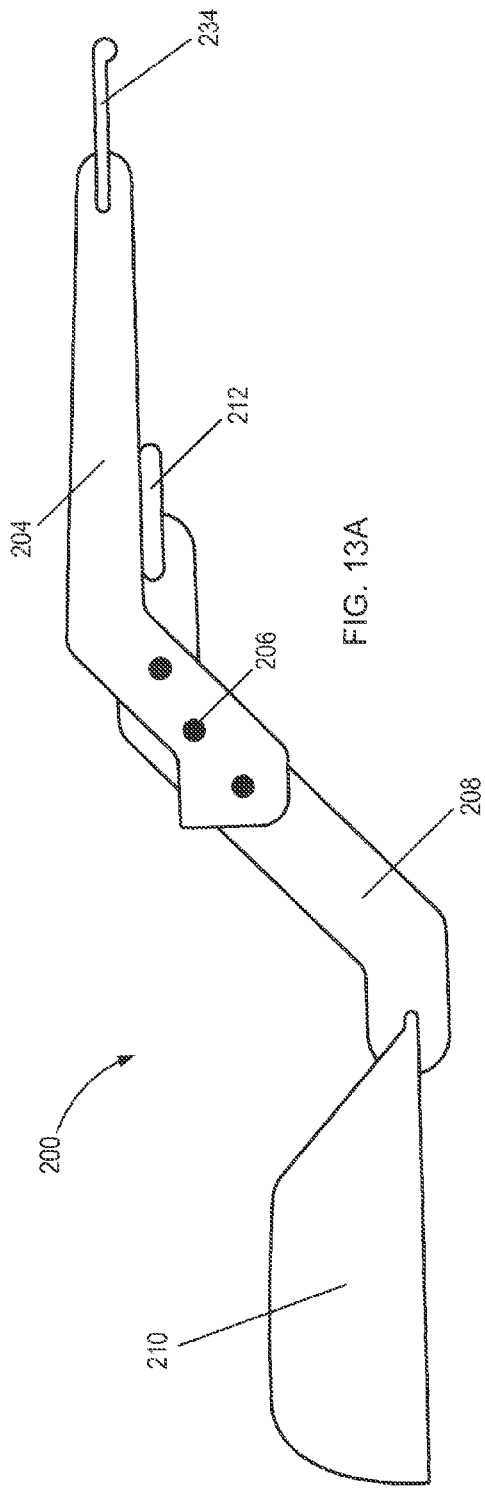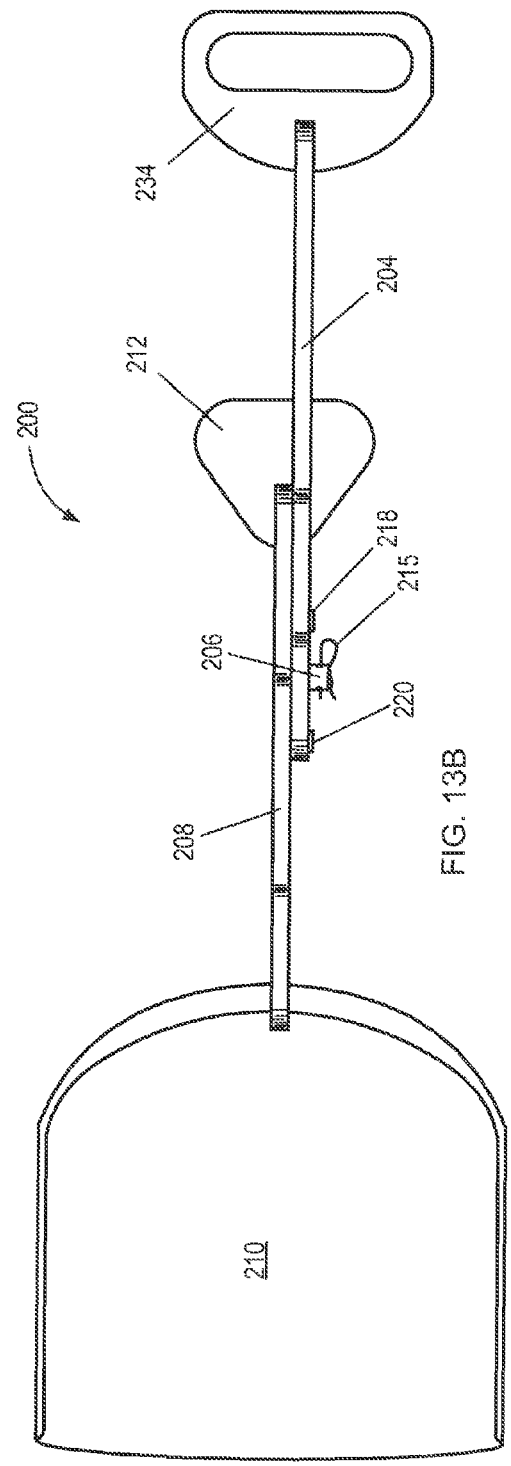

APPARATUSES AND METHODS FOR FILLING BAGS

RELATED APPLICATIONS

The present application claims benefit of priority under 35 U.S.C. §119(e) of U.S. Provisional Patent Application No. 61/975,618, filed Apr. 4, 2014, and entitled "APPARATUSES AND METHODS FOR FILLING BAGS," which is hereby incorporated herein by reference in its entirety.

TECHNICAL FIELD

The present disclosure is directed to apparatuses and methods for filling bags, and particularly to filling sand bags.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 6 is top view of a shovel of a bagging apparatus, according to one embodiment.

FIG. 7 is a side view of a bagger arm of a bagging apparatus, according to one embodiment.

FIG. 8 is a top view of a bagger arm of a bagging apparatus, according to one embodiment.

FIG. 9 is a side view of a bagging apparatus, according to another embodiment.

FIG. 10 is a top view of the lever of the bagging apparatus of FIG. 9.

FIG. 11A is a side view of the bagging apparatus of FIG. 9 in the bagging or pivoting orientation and in an insertion configuration.

FIG. 11B is a side view of the bagging apparatus of FIG. 9 in the bagging or pivoting orientation and in an operable configuration.

FIG. 12A is a side view of the bagging apparatus of FIG. 9 in the storage orientation.

FIG. 12B is a top view of the bagging apparatus of FIG. 9 in the storage orientation.

FIG. 13A is a side view of the bagging apparatus of FIG. 9 in the shovel orientation.

FIG. 13B is a top view of the bagging apparatus of FIG. 9 in the shovel orientation.

DETAILED DESCRIPTION OF PREFERRED EMBODIMENTS

Figure 1:
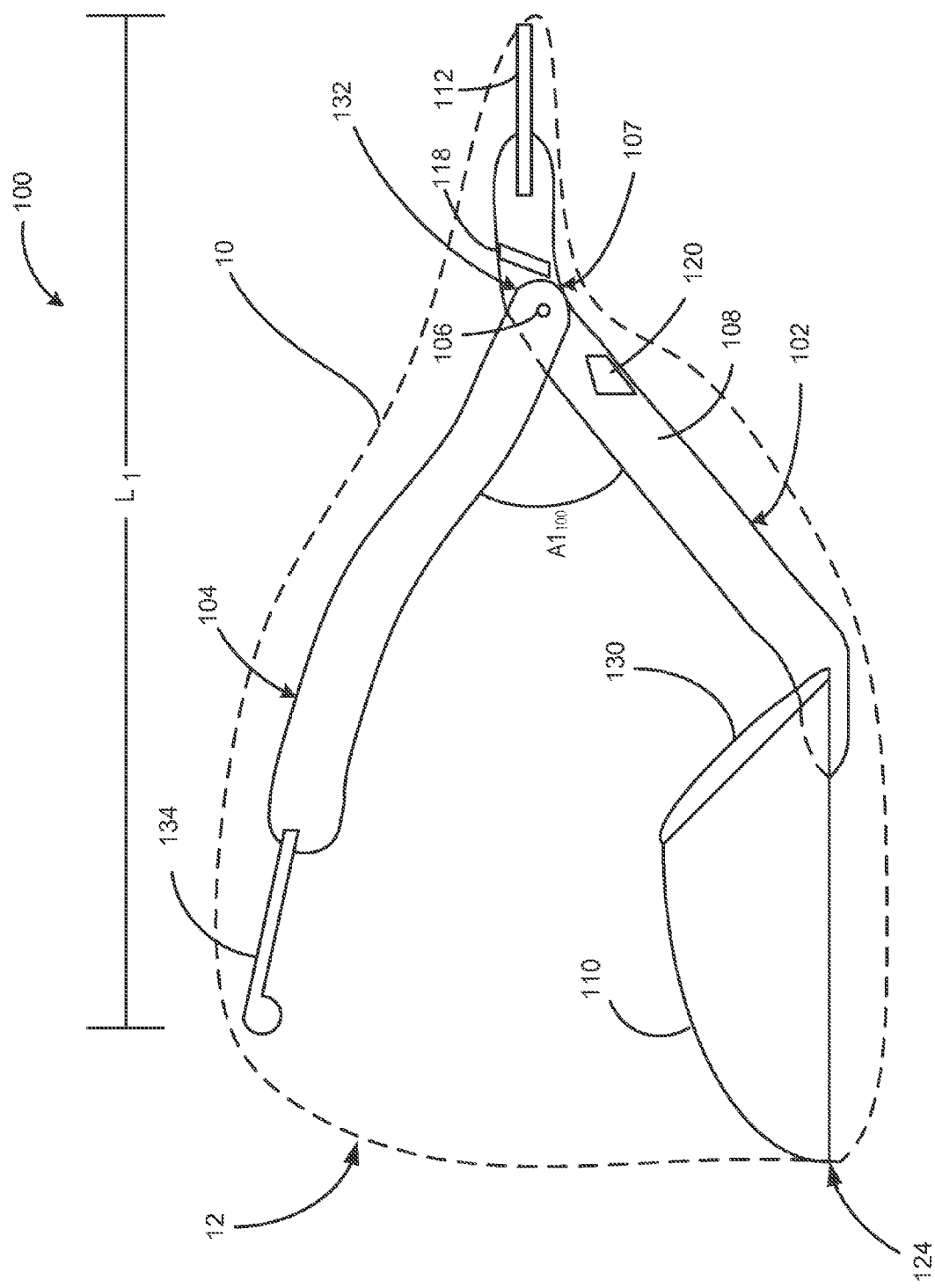
FIG. 1 is a side view of a bagging apparatus inserted into a bag, according to one embodiment.
Figure 2A:
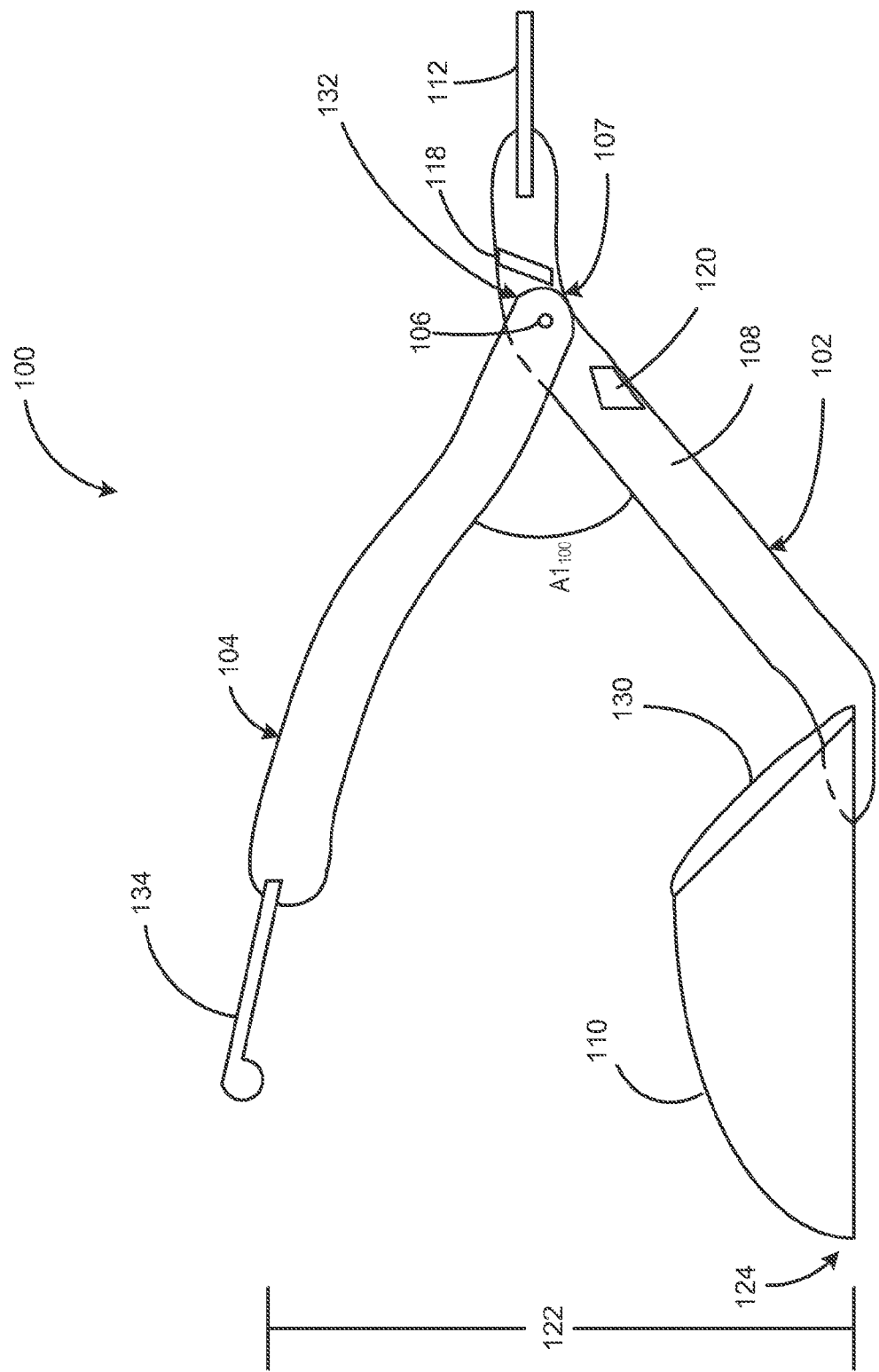
FIG. 2A is a side view of a bagging apparatus in an operable configuration, according to one embodiment.
Figure 2B:
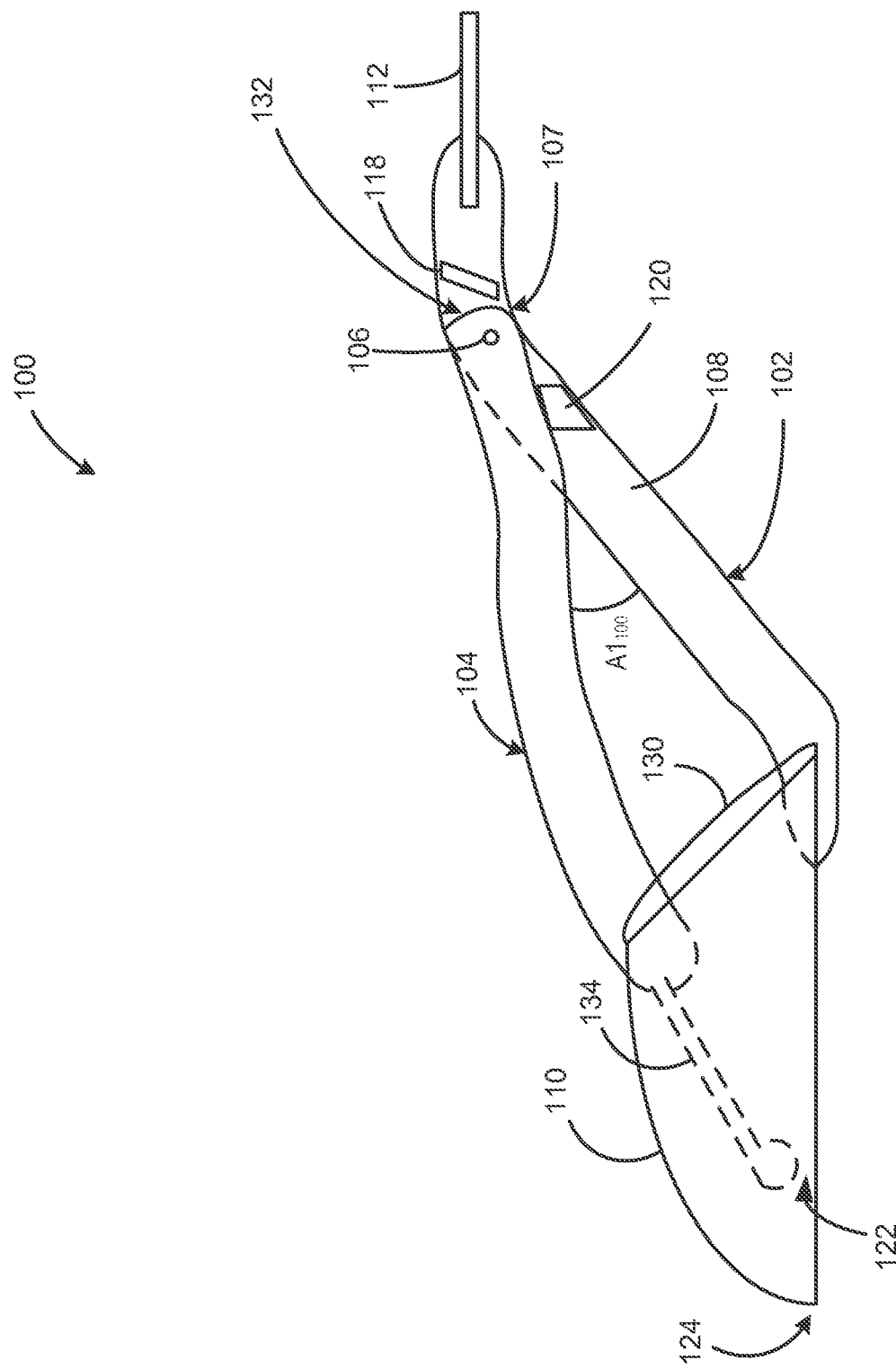
FIG. 2B is a side view of a bagging apparatus in an insertion configuration, according to one embodiment.

Flooding resulting from weather, rising water, and natural disasters is a perpetual threat to structures, property, and life, among other things. During times of flooding, or threatened flooding, relief agencies and volunteers mobilize to erect barriers to halt and/or redirect advancing flood waters, for example, to protect structures, property, and life. Time is critical and individuals strive to work quickly to erect barriers to redirect or hold the flood waters at bay. Sandbags are often filled and used to erect temporary barriers.

Sandbags are also used in other situations, such as military operations and combat, to erect temporary barriers.

Traditionally, sandbags have been filled by cooperation of two individuals. A first person holds the bag while a second person uses a traditional shovel to scoop sand or other fill material into the bag. The process to fill bags in this manner is arduous and time consuming as multiple shovels full of material are typically needed to fill a single bag. The process is also inefficient because two individuals are required to fill a single bag. Filling bags with a traditional shovel simply is not well suited for situations when moments can mean the difference between successfully containing flood waters or loss of, for example, property and/or life.

Some machines or devices that have been developed to improve the bag-filling processes are expensive and/or impractical or impossible to use in some circumstances. Moreover, some of these devices fail to substantially reduce the labor required in the bag-filling process. Many of these devices require that fill material be raised to a height above an opening of the bag to allow the fill material to fall into the bag. Thus some of these devices may be ergonomically deficient and/or fail to reduce or minimize physical effort and discomfort associated with filling bags.

The present disclosure is directed to apparatuses and methods for filling bags. The disclosed embodiments may provide a more ergonomic and efficient manner of filling bags. A bagging apparatus in an insertion configuration may be inserted into a sand bag and then moved to an operable configuration that allows the user to use a scooping motion to fill the bag. The bagging apparatus may include two handles and a shovel. The handles and shovel may be configured to be positioned within the bag during filling, which allows the user to simultaneously grasp the bag and the handles. After the bag is filled, the device can easily be removed from the bag with an upward motion, or by applying an upward force.

The disclosed apparatus and methods may enable a single individual to fill a bag with fill material. The bagging apparatus, because it may be positioned inside the bag, or mostly inside the bag, may support a length of the bag during filling. A user may grasp both the bagging apparatus and the bag during filling. Alternatively, a user may also grasp the bagging apparatus using only a single hand. The apparatus and methods may also reduce the height to which the fill material is lifted by a user to fill the bag.

Although the present disclosure is provided with frequent reference to sand bags, the bagging as described herein is not limited to filling sand bags. Other bagging applications are relevant and the disclosed embodiments can be used for other bagging applications and are not limited to sand bagging. For example, fill material is not limited to aggregate, such as sand, gravel, soil, etc., but may also include materials such as grains, seeds, nuts, salt, mulch, compost, and any of a variety of materials that may be put into, stored in, and/or transported in a bag.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of certain embodiments is not intended to limit the scope of the disclosure, but is merely representative of possible embodiments of the disclosure. In some cases, well-known structures, materials, or operations are not shown or described in detail.

Figure 3:
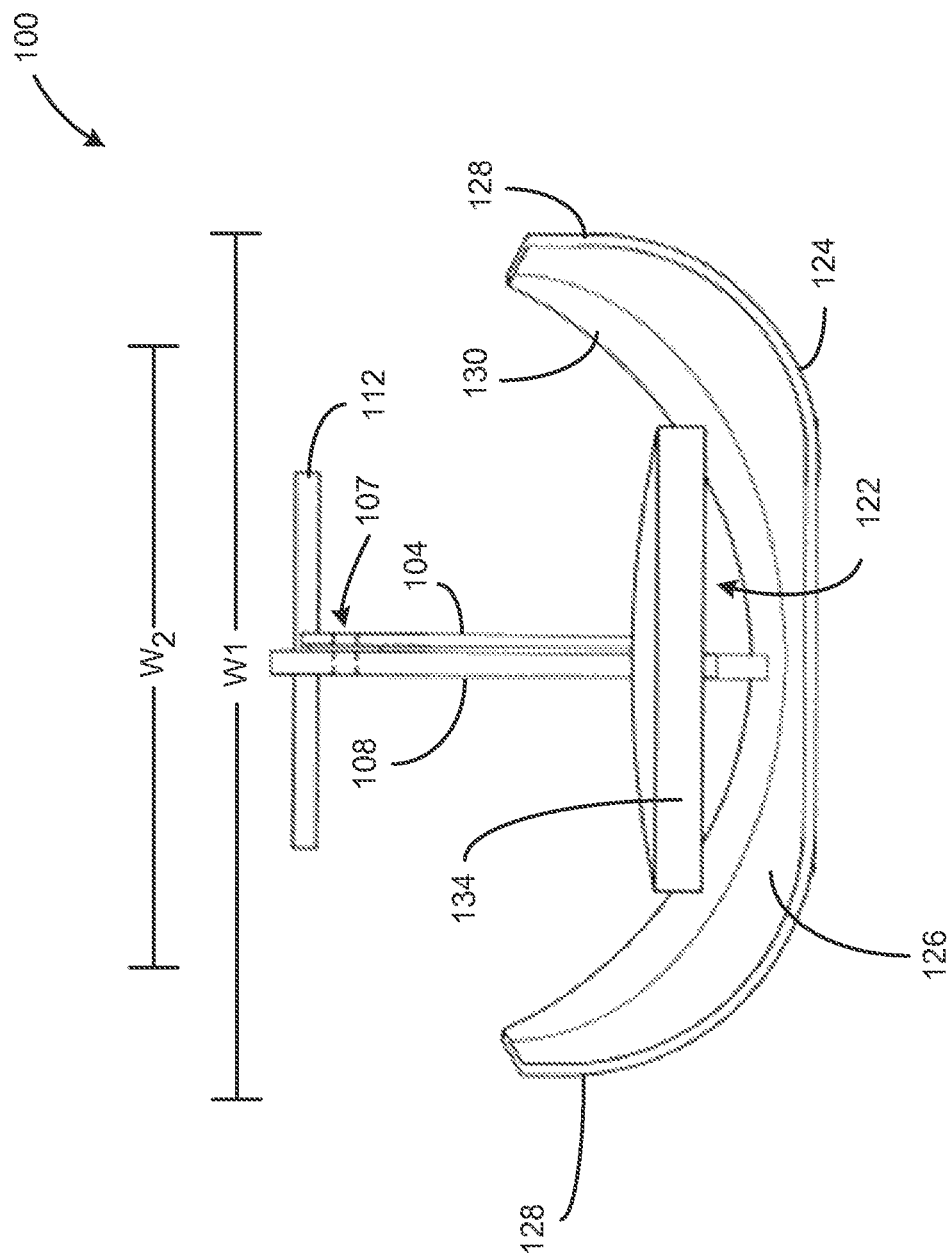
FIG. 3 is an end view of a bagging apparatus, according to one embodiment.
Figure 4:
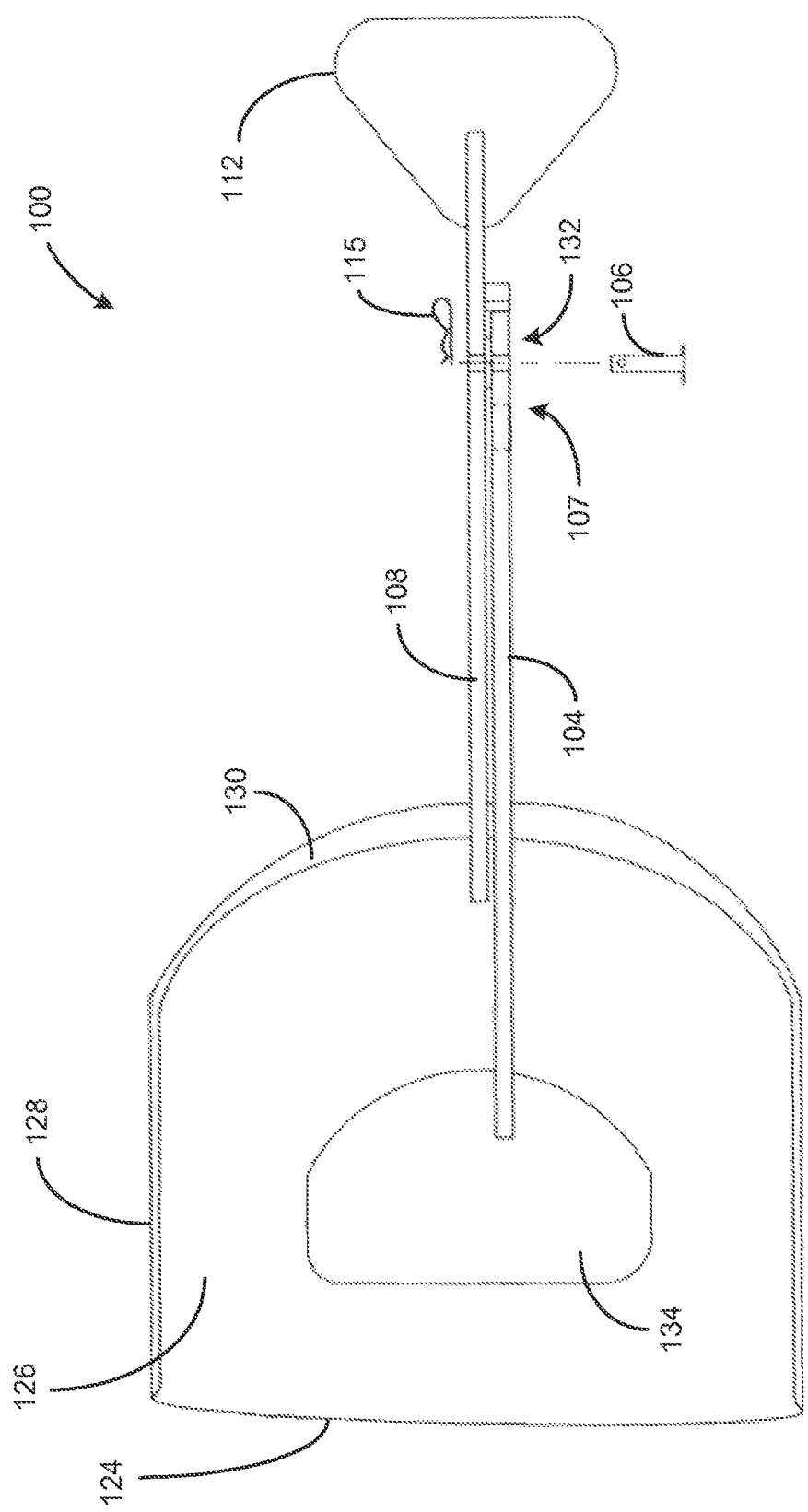
FIG. 4 is a top view of a bagging apparatus, according to one embodiment.

FIGS. 1-4 are various views of a bagging apparatus 100, according to one embodiment. FIG. 1 is a side view of the bagging apparatus 100 inserted into a bag 10. FIG. 2A is a side view of the bagging apparatus 100 in an operable configuration. FIG. 2B is a side view of the bagging apparatus 100 in an insertion configuration. FIG. 3 is an end view of the bagging apparatus 100. FIG. 4 is a top view of the bagging apparatus 100. The bagging apparatus 100 may comprise a shovel 102 and a bagger arm 104 coupled to and extending from the shovel 102.

Figure 5:
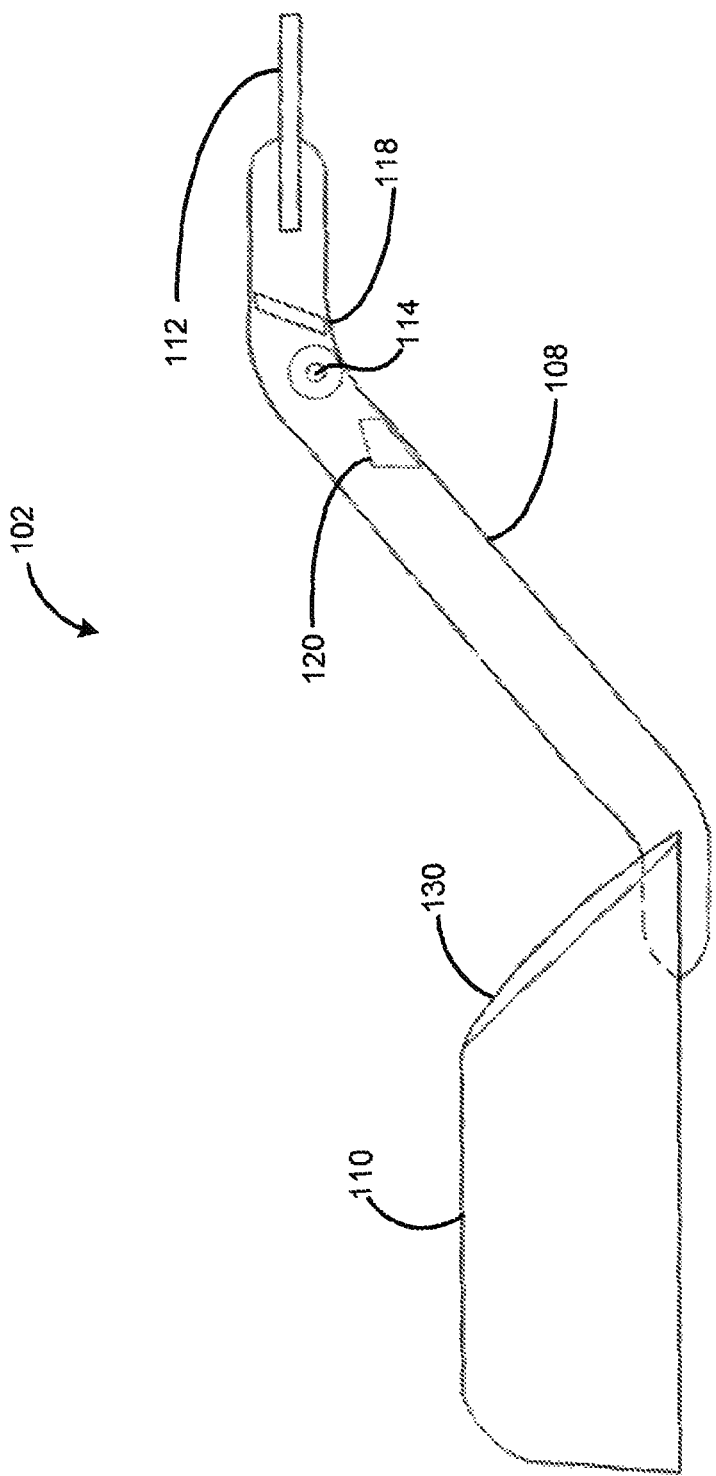
FIG. 5 is side view of a shovel of a bagging apparatus, according to one embodiment.

FIGS. 5-6 illustrate a shovel 102 of a bagging apparatus, according to one embodiment. FIG. 5 is side view of the shovel 102 of a bagging apparatus. FIG. 6 is top view of the shovel 102 of a bagging apparatus.

FIGS. 7-8 illustrate a bagger arm 104 of a bagging apparatus, according to one embodiment. FIG. 7 is a side view of the bagger arm 104 of a bagging apparatus. FIG. 8 is a top view of the bagger arm 104 of a bagging apparatus.

Referring generally and collectively to FIGS. 1-8, the illustrated bagging apparatus 100 includes a shovel 102 and an elongate bagger arm 104 rotatably coupled together by a pin 106 or other coupling device at a pivot point 107. Rotatably coupling the shovel 102 and the bagger arm 104 allows the bagger arm 104 to rotate at the pivot point 107 relative to the shovel 102, between an operable configuration (shown in FIG. 2A) and an insertion configuration (shown in FIG. 2B). In the insertion configuration, the bagger arm 104 is positioned more proximate to the shovel 102 than in the operable configuration, thereby enabling easy insertion of the bagging apparatus 100 into a bag (shown in FIG. 1). The pivot point 107 is positioned proximate to a middle portion of the shovel 102.

The shovel 102 (shown isolated in FIGS. 5-6) may include a shovel arm 108 having a shovel mouth 110 positioned at a first end (e.g., a distal end) and a shovel handle 112 at a second end (e.g., a proximal end). The shovel arm 108 may be a rigid elongate shaft having sufficient strength and rigidity to transfer force applied to the shovel handle 112 to the shovel mouth 110. Accordingly, a force applied to the shovel handle 112 in a direction toward the shovel mouth 110 may cause the shovel mouth to be propelled in the same direction, for example, to scoop fill material.

The shovel arm 108 may further include a pivot hole 114 (shown in FIG. 5) at the pivot point 107 to receive the pin 106 or other coupling device to couple the shovel 102 to the bagger arm 104. The pivot hole 114 may be positioned near the middle of the shovel arm 108, between the proximal and distal ends of the shovel arm 108. The pin 106 or other coupling device rotatably couples the bagger arm 104 to the shovel 102. A spacer 116 may be positioned adjacent to or around the pivot hole 114 to enhance rotatability of the bagger arm 104 relative to the shovel 102. The pin 106 is positioned through the pivot hole 114 and may be secured in place with a retaining clip 115. As can be appreciated, in other embodiments the pin 106 may be substituted for any suitable coupling device or mechanism, such as a rivet, a nut and a bolt, a fixed pin, or a molded pivot point. As can also be appreciated, in other embodiments the pin 106 may be integral with one of the shovel arm 108 or the bagger arm 104 and configured to mate with a pivot hole on the other.

An upper stop 118 and a lower stop 120 may be positioned proximate to the pivot hole 114 and configured to limit a rotational range of the bagger arm 104 relative to the shovel 102. The upper stop 118 may limit rotation of the bagger arm 104 away from the shovel 102 to the operable configuration. The upper stop 118 is secured to the shovel arm 108 and is sufficiently rigid such that, when the bagger arm 104 is in contact with the upper stop 118, a force on the bagger arm 104 in a direction away from the shovel 102 is transferred to the shovel 102. The lower stop 120 may limit a rotational range of the bagger arm 104 toward the shovel to the insertion configuration. In the insertion configuration, a gap 122 (or distance 122) between the shovel 102 and the bagger arm 104 may allow a user to grasp a handle 134 of the bagger arm 104, as discussed in more detail below.

The shovel mouth 110 may be configured in the shape of a scoop or similar device. The shovel mouth 110 may comprise a blade 124, a scoop area 126 (or bottom), and two sides 128. The blade 124 is positioned at a distal end of the shovel mouth (also the leading edge) and may be shaped and configured to contact and gather fill material into the scoop area 126. In the illustrated embodiment, the blade 124 is straight to provide a square point configuration to scoop loose material. The blade 124 and scoop area 126 are sized and configured to fit within the bag 10 being filled and to be positioned proximate to the bag opening 12 (or mouth). In particular, a width $W_1$ of the shovel mouth 110 is smaller than a width of the opening 12 of the bag 10, so as to allow the shovel mouth 110 to fit inside the opening 12 of the bag 10. The sides 128 aid to expand the opening 12 of the bag 10 during insertion of the bagging apparatus 100 into the bag 10. The sides 128 also aid in receiving and directing the fill material scooped into the shovel mouth 110 toward the bottom of the bag 10.

The shovel mouth 110, in some embodiments, may include a deflector 130 positioned at the proximal end of the shovel mouth 110. The deflector 130 may reduce or limit snagging of the bag on the shovel mouth 110 as the bagging apparatus 100 is inserted into the bag 10. The deflector 130 is also configured to allow fill material to pass over it during scooping, allowing the fill material to pass toward the bottom of the bag 10.

The shovel mouth 110 in the illustrated embodiment is fixedly coupled to the shovel arm 108. As can be appreciated, in other embodiments the shovel mouth 108 may be removably coupled to the shovel arm 108 to facilitate easy and convenient storage and/or transport of the bagging apparatus 100. Also, as can be appreciated, other configurations of the blade 124 are possible, such as to provide a round point configuration for digging and loosening material.

The shovel handle 112 is positioned at the proximal end of the shovel arm 108 and is configured to be grasped by a hand of a user, from outside (and through) the bag 10. Accordingly, the user grasps the shovel handle 112 and the bag 10 simultaneously. The shovel handle 112 may have a width $W_2$ that is smaller (potentially much smaller) than the width $W_1$ of the shovel mouth 110 so as to easily lead and guide the bagging apparatus 100 through the opening 12 of the bag 10 and into the bag 10 during insertion. The shovel handle 112 is configured to be positioned more toward the bottom of the bag 10 relative to the shovel mouth.

The bagger arm 104 may be an elongate shaft configured to be coupled to, and extend away from, the shovel 102. The bagger arm 104 includes a pivot hole 136 to receive the pin 106 and form the pivot point 107. The bagger arm 104 is configured to extend distally at an angle $A1_{100}$ to the shovel arm 108 from the pivot point 107. In other words, the bagger arm 104 may extend both longitudinally in the direction the shovel 102 extends (e.g. in a distal direction) and laterally away from the shovel 102. In the insertion configuration, the angle $A1_{100}$ may be relatively small, for example between about five degrees and about thirty degrees. In the operable configuration, the angle $A1_{100}$ may be larger, for example in the range of about thirty degrees and about one hundred degrees. In some embodiments, the angle $A1_{100}$ in the operable configuration may be between thirty-five degrees and ninety-five degrees. In some embodiments, the angle $A1_{100}$ in the operable configuration may be between forty degrees and ninety degrees. In some embodiments, the angle $A1_{100}$ in the operable configuration may be between forty-five degrees and eighty-five degrees. In some embodiments, the angle $A1_{100}$ in the operable configuration may be between fifty degrees and eighty degrees. In some embodiments, the angle $A1_{100}$ in the operable configuration may be between fifty-five degrees and seventy-five degrees. In some embodiments, the angle $A1_{100}$ in the operable configuration may be between sixty degrees and seventy degrees. In one embodiment, the rotational range of the bagger arm 104 (i.e., the range of angle $A1_{100}$) is approximately forty degrees.

As described, the bagger arm 104 is rotatably coupled to the shovel 102 and rotates between an insertion configuration and an operable configuration. A proximal end 132 (or proximal portion) of the bagger arm 104 of the illustrated embodiment is configured to abut against the upper stop 118 in the operable configuration and to abut against the lower stop 120 in the insertion configuration. As can be appreciated, in other embodiments, the bagger arm 104 and/or the stops 118, 120 may be configured differently, such that a proximal portion of the bagger arm 104 positioned past the pivot point 107 abuts the lower stop 120 in the operable configuration and abuts the upper stop 118 in the insertion configuration.

The bagger arm 104 may further comprise a bagger arm handle 134 positioned at a distal end of the bagger arm 104. The bagger arm handle 134 rotates in the gap 122. In the insertion configuration, the gap 122 (or distance 122) between the shovel mouth 110 and the bagger arm handle 134 is relatively small, perhaps only sufficiently wide to allow a hand of a user to grasp the bagger arm handle 134 to hold the bagging apparatus 100 during insertion into the bag 10. In the operable configuration, the gap 122 (or distance 122) between the shovel mouth 110 and the bagger arm handle 134 is larger so as to prop open the mouth 12 of the bag 10 for easy filling. A length $L_1$, between the bagger arm handle 134 (positioned toward the distal end of the bagging apparatus 100) and the shovel handle 112 (positioned toward the proximal end of the bagging apparatus), is a length of the bag 10 that is supported by the bagging apparatus during operation (e.g., filling the bag).

The bagging apparatus 100 may be formed of a rigid plastic material that may be injection molded and/or laser-cut to a desired shape. As can also be appreciated, the bagging apparatus may be formed of any appropriately rigid material, such as a material sufficiently rigid to hold its shape during scooping aggregate material, for example aluminum, other types of metal and/or metal alloy, wood, and fiberglass.

Use of the bagging apparatus 100 is now described. With the bagging apparatus 100 in the insertion configuration, the shovel handle 112 may be inserted into an empty bag (e.g., a sandbag), toward the bottom or bottom portion, or closed end, of the bag 10. The shovel handle 112, now positioned within the bag 10, may be grasped, for example, by a user with one hand from without the bag 10, such that a wall of the bag 10 is positioned in between the shovel handle 112 and the hand holding (grasping) the shovel handle 112. In another embodiment, a mechanical apparatus may grip the shovel handle 112.

The deflector 130 may prevent the bag 10 from snagging on the shovel mouth 110 as the bagging apparatus 100 is inserted into the bag 10. The pin assembly, including the pin 106, the retaining clip 115, and the spacer 116, provides a hinge between the shovel arm 108 and the bagger arm 104. The stops 118, 120 restrict the range of motion of the bagger arm 104 and may allow for easy insertion of the bagging apparatus 100 into the empty bag 10.

The bagger arm handle 134 may also be positioned inside the bag 10, extending from the pivot point 107, toward a top portion of the bag to a position at or near the opening of the bag. The bagger arm handle 134 can be grasped by the user with the other hand at a position proximate the opening 12 of the bag 10. A lip of the bag 10 at the opening 12 may be wrapped around the bagger arm handle 134 to secure the bag 10 relative to the bagging apparatus. For example, a user may grasp the bagger arm handle 134 with a portion of the bag 10 positioned between the user's palm and the handle 134. The user's fingers may curl around the handle 134 and extend into the opening 12 of the bag 10. In other embodiments, a mechanical apparatus may grip the bagger arm handle 134, and simultaneously grip a portion of the bag 10 against the bagger arm handle.

The shovel mouth 110 is also positioned inside the bag 10 with the blade 124 disposed at or proximate the opening 12 of the bag. In the operable configuration, the shovel mouth 110 and the bagger arm handle 134 may provide tension at the bag opening 12 to hold the bag 10 open. Rotating the bagger arm handle 134 about the pivot point 107 toward the shovel handle 112 configures the bagging apparatus in the operable configuration, opening the mouth 12 of the bag 10 and providing tension to the mouth 12 of the bag 10 to limit slippage of the bag 10 relative to the shovel mouth 110 during filling. The shovel mouth 110 is then scooped into aggregate (i.e., fill material, such as sand, gravel, dirt). For example, a user may stoop down and scoop the shovel mouth 110 into the aggregate. In another example, a machine may scoop the shovel mouth 110 into the aggregate. The handles 112, 134 provide grip and stability while the movement is executed to thereby fill the empty bag 10.

When the bag 10 is a third to a half full, the bag 10 and bagging apparatus 100 can be tilted up to a vertical position and the bagging apparatus 100 can be pulled out of the bag 10. The weight of the filled bag 10 may allow the bagging apparatus 100 to easily slip out of the bag 10 (e.g., withdrawing from or through the fill material within the bag 10). The bagging apparatus 100 is removed from the full bag 10 by pulling on the bagger arm handle 134, for example with an upward motion. The low profile of the bagging apparatus 100, and narrow profile of the proximal end of the bagging apparatus, reduces drag (through the fill material within the bag 10) as the bagging apparatus 100 is removed from the filled bag 10. Using an upward motion to remove the bagging apparatus 100 may leave the filled bag standing. The bagging apparatus 100 is again ready for insertion into the next empty bag.

The bagging apparatus may enable the bag to be filled without raising any fill material to a height above the opening 12 of the bag 10. The bag 10 may be filled in a horizontal, or approximately horizontal, configuration and may be raised to a vertical configuration (e.g., for tying or otherwise closing the bag) without the fill material ever being raised to a vertical height above a vertical height of the opening 12 of the bag 10 when the bag is in a vertical (or approximately vertical) configuration or upright orientation greater than approximately 45 degrees vertical from level ground. In some embodiments, the upright orientation may be greater than approximately 60 degrees vertical from level ground. In some embodiments, the upright orientation may be greater than approximately 70 degrees vertical from level ground. In some embodiments, the upright orientation may be greater than approximately 80 degrees vertical from level ground.

When the pivot point 107 is positioned slightly lower than the line of the handles 112, 134, pressure inward will push the blade 124 of the shovel 102 down (or lower) to facilitate scooping fill material. Also, because the blade 124 is lower than the handles 112, 134, the blade 124 will automatically pull the bag 10 open when resistance is applied. Tension from the bag 10 can hold the blade 124 and handles 112, 134 in place. The bag 10 may effectively become a part of the bagging apparatus 100 and of the mechanics of operating the bagging apparatus 100.

FIGS. 9-13 depict a bagging apparatus 200, according to another embodiment, that resembles the bagging apparatus 100 described above in certain respects. Accordingly, like features are designated with like reference numerals, with the leading digits incremented to "2." For example, the embodiment depicted in FIGS. 9-13 includes a shovel 202 that may, in some respects, resemble the shovel 102 of FIGS. 1-8. Relevant disclosure set forth above regarding similarly identified features, thus, may not be repeated hereafter. Moreover, specific features of bagging apparatuses and related components shown in FIGS. 1-8 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the bagging apparatus 200 and related components depicted in FIGS. 9-13. Any suitable combination of the features, and variations of the same, described with respect to the apparatus 100 and related components illustrated in FIGS. 1-8, can be employed with the bagging apparatus 200 and related components of FIGS. 9-13, and vice versa.

The bagging apparatus 200 of FIGS. 9-13 includes a shovel 202 and a lever 203 that are configured to couple to one another and facilitate transitions between three distinct orientations: a bagging or pivoting orientation, a storage orientation, and a shovel orientation. More particularly, in some embodiments, a user may transition the bagging apparatus 200 between the first orientation (e.g., bagging/pivoting orientation), the second orientation (e.g., storage orientation), and the third orientation (e.g., shovel orientation) by altering an arrangement of the shovel 202 with respect to the lever 203 and thereby altering an interaction of one or more coupling elements 280.

FIG. 9 provides an enlarged side view of the bagging apparatus 200 including the shovel 202, the lever 203, and one or more coupling elements 280. In FIG. 9, the shovel 202 is uncoupled from the lever 203.

The shovel 202 may comprise an elongate shovel arm 208 comprising a distal end and a proximal end. The distal end may be configured to couple to a shovel mouth (not shown), and the proximal end may be configured to couple to a shovel handle (not shown). In some embodiments, the shovel arm, shovel mouth, and shovel handle are integrally formed, attached to each other, or otherwise coupled to one another.

The elongate shovel arm 208 may be shaped and dimensioned in any suitable manner. For example, the shovel arm 208 may comprise a proximal portion 291 and a distal portion 293 that are parallel to each and a center portion 292 (or angled portion) disposed between the proximal portion 291 and the distal portion 293. The proximal portion 291 is disposed at a proximal end of the center portion 292 and the distal portion 293 is disposed at a distal end of the center portion 292. The center portion 292 extends between the distal portion 293 and the proximal portion 291. The center portion 292 may be angled relative to the proximal portion 291 and the distal portion 293. A longitudinal axis 295 of the center portion 292 is disposed at a first angle $A1_{200}$ to a longitudinal axis 294 of the proximal portion 291 and is disposed at a second angle $A2_{200}$ to a longitudinal axis 296 of the distal portion 293. In certain embodiments, the longitudinal axis 296 of the distal portion 293 is parallel to the longitudinal axis 294 of the proximal portion 291, such that the first angle $A1_{200}$ and the second angle $A2_{200}$ are the same. In other embodiments, the elongate shovel arm 208 may follow a generally sigmoidal path. One of ordinary skill in the art, with the benefit of this disclosure, will recognize that other suitable shapes for the elongate shovel arm 208 are possible and within the scope of this disclosure.

The lever 203 may include an elongate lever arm 204 with a lever handle (not shown, but see lever handle 234 in FIG. 11B). The elongate lever arm 204 of the bagging apparatus 200 may include a first end and a second end disposed opposite of the first end. The first end of the elongate lever arm 204 (or a distal portion of the elongate lever arm 204 disposed adjacent the first end) may be configured to couple to the lever handle. For example, the handle may be integrally formed with, attached to, connected to (e.g., welded), or otherwise associated with the first end of the elongate lever arm 204. The elongate lever arm 204 includes a proximal portion 271, an angled portion 272, and a distal portion 273. The proximal portion 271 is disposed at a proximal end of the angled portion 272. The distal portion 273 is disposed at a distal end of the angled portion 272. The angled portion 272 extends between the distal portion 273 and the proximal portion 271. A longitudinal axis 275 of the angled portion 272 is disposed at a first angle $A3_{200}$ to a longitudinal axis 274 of the proximal portion 271 and is disposed at a second angle $A4_{200}$ to a longitudinal axis 276 of the distal portion 273. In certain embodiments, the longitudinal axis 276 of the distal portion 273 is parallel to the longitudinal axis 274 of the proximal portion 271, such that the first angle $A3_{200}$ and the second angle $A4_{200}$ are the same.

The elongate lever arm 204 may be configured to couple to the elongate shovel arm 208 via one or more coupling elements 280 (described in greater detail below). For example, in some circumstances, the elongate lever arm 204 may be configured to couple to the elongate shovel arm 208 via at least one or more coupling elements 280 that includes, or that is/are configured to function as, a pivot about which the elongate lever arm 204 may rotate (e.g., a pin 206).

The one or more coupling elements 280 are configured to couple the elongate lever arm 204 to the shovel 202. The coupling elements 280 may be configured to couple the elongate lever arm 204 to the elongate shovel arm 208 in a plurality of orientations, such as a bagging/pivoting orientation, a storage orientation, and/or a shovel orientation, as described more fully below. In some embodiments, some or all of the coupling elements 280 may be integrally formed with one or more of the shovel 202 and/or the elongate lever arm 204. For example, some of the one or more coupling elements 280 that are integrally formed with the elongate shovel arm 208 (e.g., pins 206, 218, 220) may be disposed closer to the second end of the elongate lever arm 204 than the first end of the elongate lever arm 204.

Any suitable one or more coupling elements may be used to couple an elongate lever arm 204 to a shovel 202. For example, in some embodiments, the one or more coupling elements may comprise a rivet, a nut and bolt, a fixed pin or peg, a molded pivot, a retaining clip (e.g., a cotter key), or combinations thereof.

In the embodiment depicted in FIG. 9, the coupling elements 280 include a pin assembly. In some embodiments, the pin assembly may include three pins or pegs 206, 218, 220 that are integrally formed with the shovel 202, three holes 282, 284, 286 disposed adjacent the second end of the elongate lever arm 204, and a retaining clip 215. The one or more pins 206, 218, 220 may comprise a center pin 206, and two outer pins (e.g., proximal outer pin 218 and distal outer pin 220). One or more of the holes 282, 284, 286 may be positioned to be disposed around one or more of the pegs or pins 206, 218, 220 when the shovel 202 is coupled to the elongate lever arm 204.

FIG. 10 provides a top view of the elongate shovel arm 208. As depicted in this view, some of the one or more coupling elements 280 (e.g., pin assembly pins) may extend outwardly from the elongate shovel arm 208. For example, in FIG. 10, pins 206, 218, and 220 extend from the elongate shovel arm 208. A center pin 206 may extend outward further than one or more outer pins 218, 220. The center pin 206 may further comprise a hole 207 or other structure configured to facilitate secured coupling of the elongate lever arm 204 to the elongate shovel arm 208. For example, when a hole of the elongate lever arm 204 (e.g., hole 282, 284, or 286) is disposed around center pin 206, a retaining clip 215 may be inserted through the hole of the center pin 206 to prevent inadvertent uncoupling of the elongate lever arm 204 from the elongate shovel arm 208.

Figure 11:
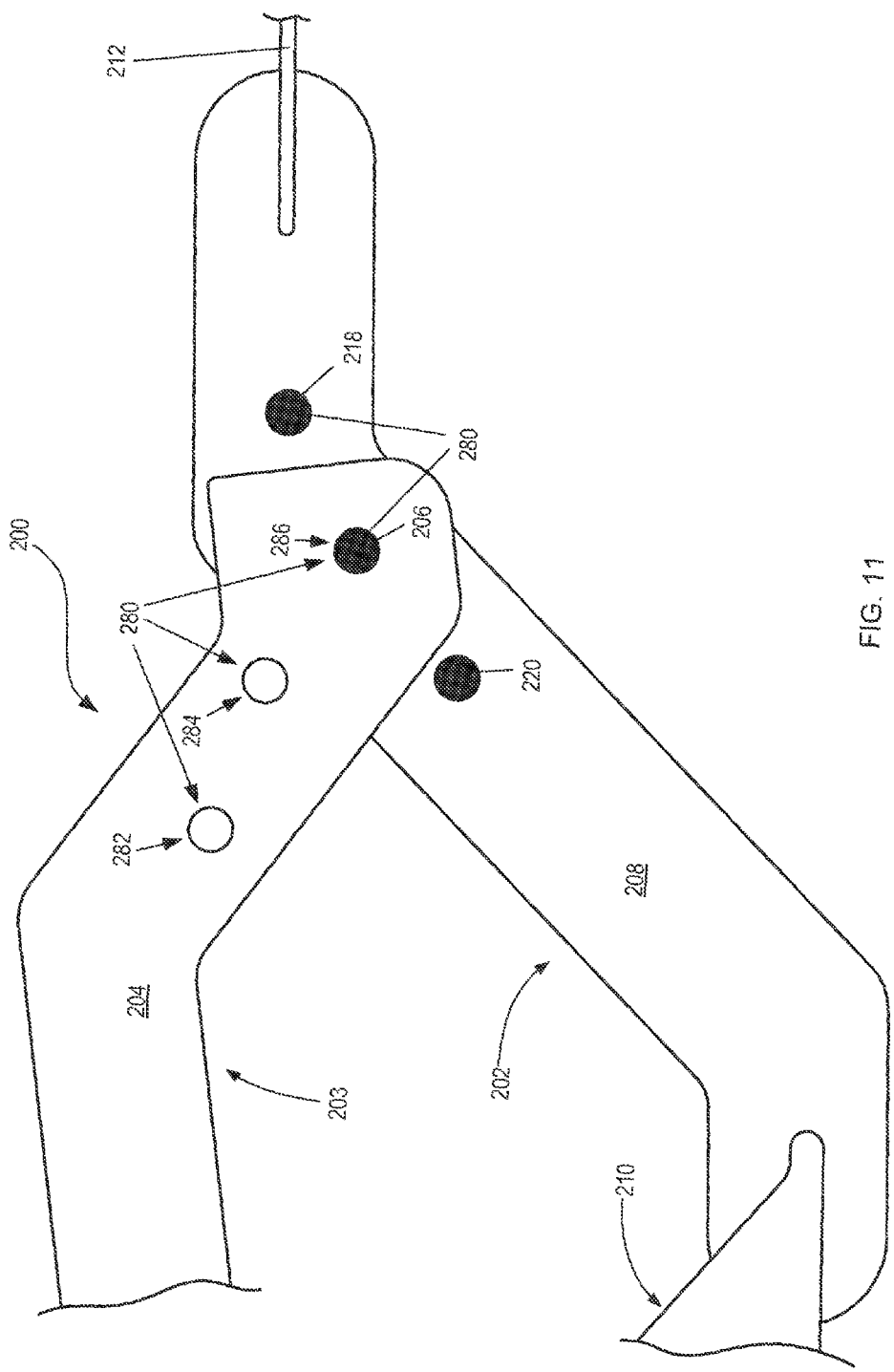
FIG. 11 is an enlarged side view of the bagging apparatus of FIG. 9 in a bagging or pivoting orientation.

FIG. 11 provides a side view of a bagging apparatus 200 in a first (e.g., "bagging" or "pivoting") orientation that is similar to the orientation described above in connection with FIGS. 1-8. When in the bagging orientation, the bagging apparatus 200 may be configured both (1) to be inserted into a bag and (2) to facilitate insertion of fill material into a bag. For example, the bagging apparatus 200, when in the bagging orientation, may transition between an insertion configuration (as shown in FIG. 11A) and an operable configuration (as shown in FIG. 11B) in a manner similar to that described above in connection with the bagging apparatus 100. The bagging apparatus 200 may be inserted into a bag (e.g., a sand bag) when in the insertion configuration and then moved to an operable configuration that allows the user to use a scooping motion to fill the bag.

Referring generally and collectively to FIGS. 11, 11A, and 11B, the bagging apparatus 200 comprises a shovel 202 and a lever 203. The shovel 202 may comprise an elongate shovel arm 208, a shovel mouth 210 configured to couple to the elongate shovel arm 208 adjacent a distal end of the elongate shovel arm 208, and a shovel handle 212 configured to couple to the elongate shovel arm 208 adjacent a proximal end of the elongate shovel arm 208. For example, the shovel arm 208, shovel mouth 210, and shovel handle 212 may be integrally formed, attached to each other, or otherwise associated with one another. In some embodiments, the lever 203 of the bagging apparatus 200 comprises an elongate lever arm 204 and a handle 234 that is disposed adjacent a first end of the elongate lever arm 204 (e.g., a distal end of the elongate lever arm 204 when the elongate lever arm 204 is orientated in the bagging orientation as shown in FIG. 11).

In the bagging orientation, the elongate lever arm 204 may be rotatably coupled to the elongate shovel arm 208 via one or more coupling elements 280, such as a pivot (e.g., center pin 206 in FIG. 11). In this orientation, most of the elongate lever arm 204 extends in a distal direction from the pivot 206 and at an angle relative to the elongate shovel arm 208. One or more pins or other elements disposed adjacent the pivot 206 (e.g., proximal outer pin 218 and distal outer pin 220) may function as or otherwise include an upper stop 218 and a lower stop 220. The upper and lower stops 218, 220 may limit the rotational range about which the elongate lever arm 204 may rotate when the apparatus is in the bagging (i.e., pivoting) orientation. The upper stop 218 may limit the rotational range of the elongate lever arm 204 as it rotates in a direction away from the elongate shovel arm 208 (e.g., to the operable configuration). The lower stop 220 may limit the rotational range of the elongate lever arm 204 when the elongate lever arm 204 rotates in a direction toward the elongate shovel arm 208 (e.g., to the insertion configuration).

The bagging apparatus 200, when in an insertion configuration, may be inserted into a bag and then moved to an operable configuration that allows the user to use a scooping motion to fill the bag. For example, when in the insertion configuration, the bagging apparatus 200 may be positioned such that the shovel mouth 210 is disposed at the opening of the bag, within the bag, and adjacent a first side of the opening of a bag. By rotating the elongate lever arm 204 about a pivot, the apparatus 200 may transition to an operable configuration, thereby creating (or increasing) a gap between the shovel mouth 210 and the lever handle 234 to hold the bag open during filling. Disposed within the bag in this manner, a user may grasp the lever handle 234 from outside the bag adjacent a second side of the opening of the bag (i.e., the side opposite the first side), grasp the elongate shovel handle 212 from outside the bag, and scoop the shovel mouth 210 into fill material. The user may alternatively grasp only the lever handle 234 with a single hand and scoop the shovel mouth 210 into fill material. The shovel mouth 210 may direct fill material into the bag and allow fill material to pass into and at least partially fill the bag.

Figure 12:
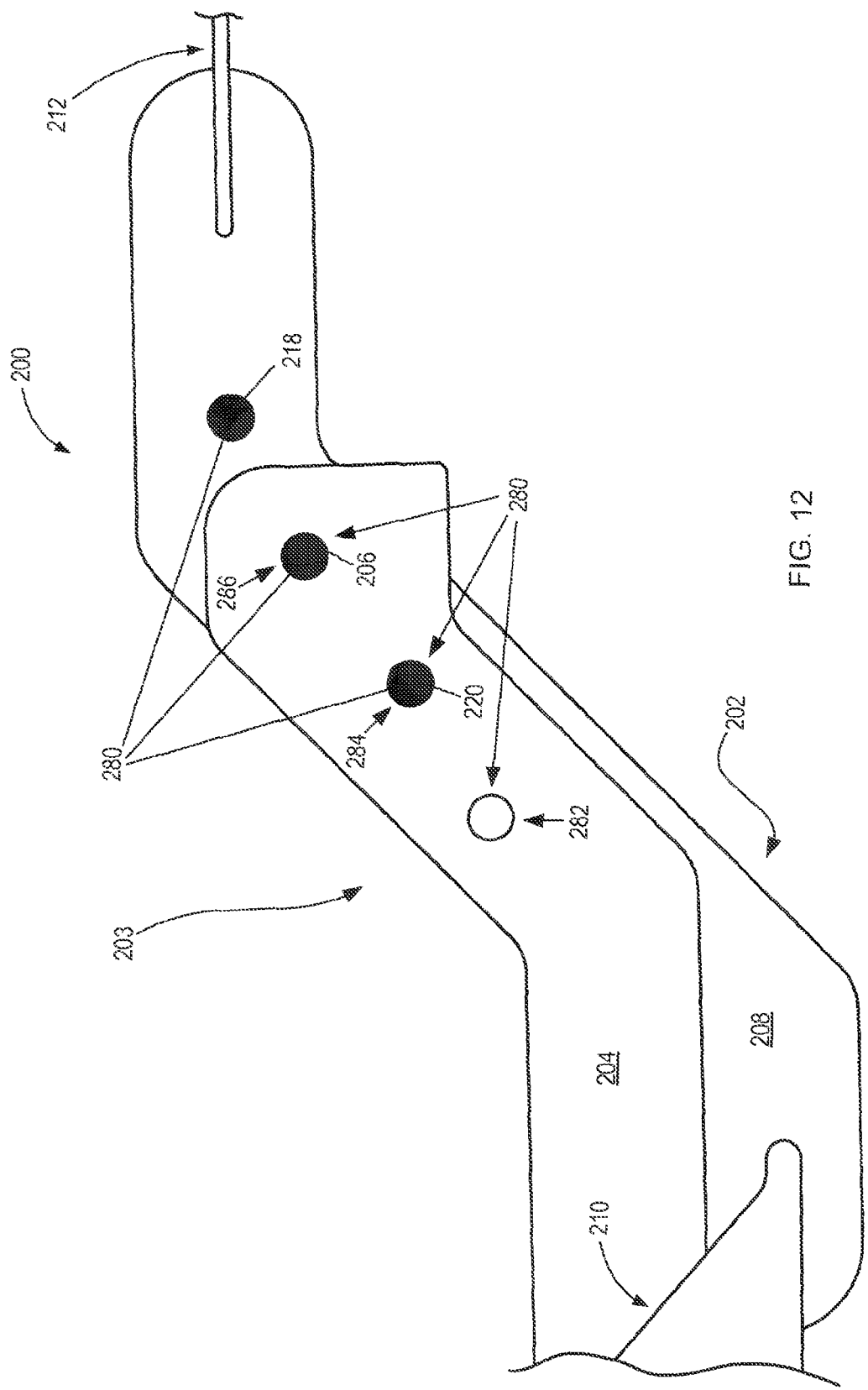
FIG. 12 is an enlarged side view of the bagging apparatus of FIG. 9 in a storage orientation.

FIGS. 12, 12A, and 12B depict the bagging apparatus 200 in a second (e.g., "storage") orientation. More specifically, FIG. 12 provides an enlarged side view of the bagging apparatus 200 in a storage orientation, FIG. 12A provides a side view of the bagging apparatus 200 in a storage configuration, and FIG. 12B provides a top view of the bagging apparatus 200 in a storage orientation. As depicted in these figures, when the bagging apparatus 200 is in a storage configuration, the elongate lever arm 204 may be non-rotatably coupled to the elongate shovel arm 208 and extend from one or more coupling elements 280 in a generally distal direction toward the shovel mouth 210. Stated differently, when the bagging apparatus 200 is in the storage orientation, the lever handle 234 may extend toward and be disposed adjacent to the shovel mouth 210. When the elongate lever arm 204 is coupled to the elongate shovel arm 208 in the storage configuration, the elongate lever arm 204 remains in a fixed position (or a generally fixed position) relative to the shovel mouth 210. The elongate lever arm 204 does not pivot about the elongate shovel arm 208 when the bagging apparatus 200 is in the storage configuration.

In some embodiments, when the bagging apparatus 200 is in a storage configuration, the elongate lever arm 204 and the elongate shovel arm 208 are non-rotatably coupled together via a pin assembly. For example, in some embodiments, a first hole 286 may be disposed around the center pin 206, and a second hole 284 may be disposed around an outer pin (e.g., outer distal pin 220). A retaining clip 215 may be used to prevent the elongate lever arm 204 from uncoupling from the center pin 206. Coupling of the elongate lever arm 204 to the elongate shovel arm 208 in this manner prevents the elongate lever arm 204 from rotating relative to the elongate shovel arm 208. In some embodiments, the first end of the elongate lever arm 204 may be disposed closer to the distal end of the elongate shovel arm 208 when the bagging apparatus 200 is in the storage orientation than when the bagging apparatus 200 is in the bagging orientation and/or the shovel orientation. In other words, the distance between the first end of the elongate lever arm 204 and the distal end of the shovel arm 208 may be greater in the second (e.g., storage) configuration than in a first (e.g., bagging) orientation or a third (e.g., shovel) orientation.

Additionally or alternatively, in some embodiments, a bagging apparatus 200 in the storage orientation is in a more compact state and/or has a smaller profile relative to a bagging apparatus 200 in the bagging orientation and/or the shovel orientation.

The bagging apparatus 200 may be configured to be transitioned between a first orientation (e.g., the bagging orientation) and a second orientation (e.g., a storage orientation). For example, in some embodiments, the bagging apparatus 200 may be transitioned from the bagging orientation to the storage orientation by uncoupling the elongate lever arm 204 at the coupling elements 280, rotating the elongate lever arm 204 such that the first end of the elongate lever arm 204 extends closer toward the distal end of the shovel arm 208 than in the first orientation, and non-rotatably coupling the elongate lever arm 204 to the elongate shovel arm 208 at the coupling elements 280. In the bagging apparatus 200 of FIGS. 9-13, the transition from the bagging orientation to the storage configuration is accomplished by uncoupling the elongate lever arm 204 from the center pin 206, rotating the elongate lever arm 204 such that the first end of the elongate lever arm 204 extends closer toward the distal end of the shovel arm 208 than in the first orientation, and non-rotatably coupling the elongate lever arm 204 to the elongate shovel arm 208 at the center pin 206 and another coupling element 280, such as the outer pin 220 and/or the outer pin 218. Stated differently, a non-rotatable coupling may be accomplished by disposing a plurality of holes in the elongate lever arm 204 around a plurality of pins extending from the shovel arm 208 (e.g., holes 286 and 284 around pins 206 and 220).

Figure 13:
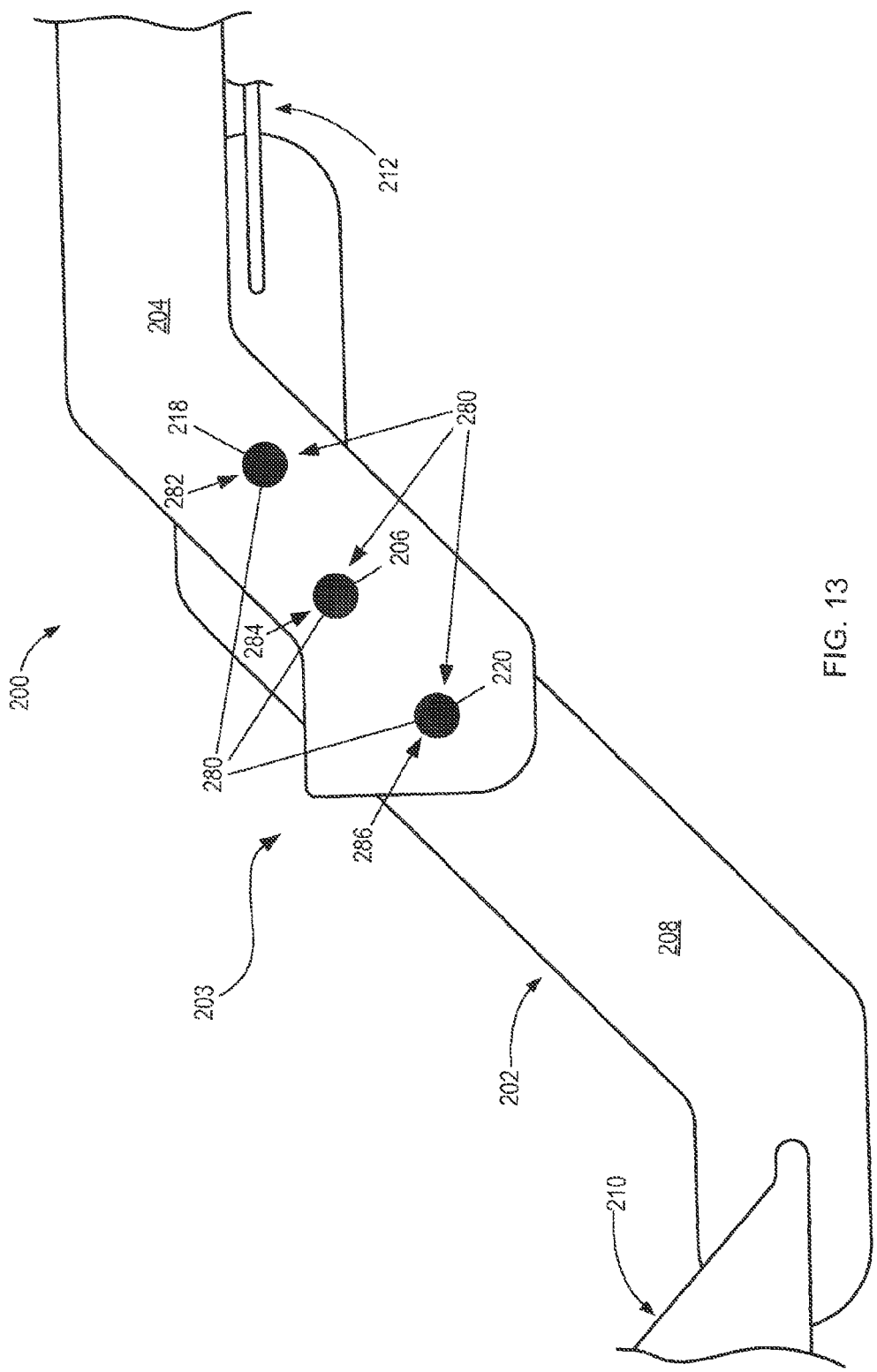
FIG. 13 is an enlarged side view of the bagging apparatus of FIG. 9 in a shovel orientation.

FIGS. 13, 13A and 13B depict the bagging apparatus 200 in a third (e.g., "shovel") orientation. More particularly, FIG. 13 provides an enlarged side view of the bagging apparatus 200 in a shovel orientation, FIG. 13A provides a side view of the bagging apparatus 200 in a shovel configuration, and FIG. 13B provides a top view of the bagging apparatus 200 in a shovel orientation. As depicted in these FIGS. 13, 13A, and 13B, when in the shovel orientation, the elongate lever arm 204 may be non-rotatably coupled to the shovel 202 such that most of the elongate lever arm 204 extends in a generally proximal direction from the one or more coupling elements 280. When in the shovel configuration, the elongate lever arm 204 may extend proximal of the shovel 202 to function as an extension of the elongate shovel arm 208.

In some circumstances, a bagging apparatus 200 in a shovel orientation may be used like a traditional shovel.

As shown in FIG. 13, when the bagging apparatus 200 is in a shovel configuration, the elongate lever arm 204 and the elongate shovel 208 may be coupled to each other via coupling elements 280. More particularly, the elongate lever arm 204 and the elongate shovel 208 may be coupled to each other via a pin assembly. For example, pin 220 may be inserted through a first hole 286, center pin 206 may be inserted through a second hole 284, and outer proximal pin 218 may be inserted through a third hole 282. A retaining clip 215 may be used to prevent the elongate lever arm 204 from uncoupling from the center pin 206. When the coupling elements 280 are arranged in this manner, the elongate lever arm 204 cannot rotate about one or more of the coupling elements 280. When the elongate lever arm 204 is coupled to the elongate shovel arm 208 in the shovel configuration, the elongate lever arm 204 remains in a fixed position (or generally fixed position) relative to the elongate shovel arm 208 and the shovel mouth 210. Stated differently, the elongate lever arm 204 does not pivot about the elongate shovel arm 208 when the bagging apparatus 200 is in the shovel configuration.

The bagging apparatus 200 may be transitioned between a first (e.g., bagging) orientation and a third (e.g., shovel) orientation. For example, the bagging apparatus 200 may be transitioned from the bagging orientation to the shovel orientation by uncoupling the elongate lever arm 204 from the center pin, rotating the elongate lever arm 204 such that the first end extends proximally from the second end, and non-rotatably coupling the elongate lever arm 204 to the elongate shovel arm 208 (e.g., by disposing a plurality of holes around a plurality of pins. For example, the three holes disposed adjacent the second end of the elongate lever arm 204 (e.g., holes 282, 284, 286) may be disposed around three pins (e.g., pins 206, 218, 220) extending from the shovel arm 208 to non-rotatably couple the elongate lever arm 204 to the elongate shovel arm 208.

The bagging apparatus 200 may also transition between a second (e.g., storage) orientation and a third (e.g., shovel) orientation). For example, the bagging apparatus 200 may be transitioned from the storage orientation to the shovel orientation by uncoupling the elongate lever arm 204 from the shovel arm 208 (e.g., removing the elongate lever arm 204 from outer distal pin 220 and center pin 206), rotating the elongate lever arm 204 such that the first end extends proximally from the second end, and non-rotatably coupling the elongate lever arm 204 to the elongate shovel arm 208 (e.g., by placing each of the three holes 282, 284, 286, which are disposed adjacent the second end of the elongate lever arm 204, around one of the pins 218, 206, 220 extending from the shovel arm 208).

EXAMPLE EMBODIMENTS

The following embodiments are illustrative and merely examples and not limiting of the scope of the present disclosure.

In some embodiments, an apparatus for filling a bag comprises a shovel, a lever. The shovel may include an elongate shovel arm, a shovel mouth disposed at a distal end of the elongate shovel arm, and a shovel handle disposed at a proximal end of the elongate shovel arm. The lever may include an elongate lever arm and a lever handle that is disposed at a first end of the elongate lever arm, wherein the elongate lever arm configured to couple to the elongate shovel arm at a pivot point. The lever may be configured to rotatably couple to the shovel at the pivot point in a first orientation in which (1) the elongate lever arm is rotatable about the pivot point between an operable configuration and an insertion configuration, and (2) the elongate lever arm extends from the pivot point in a distal direction and at an angle to the shovel arm. The lever arm may also be configured to non-rotatably couple to the shovel at the pivot point in a second orientation in which the elongate lever arm extends in a distal direction toward the shovel mouth.

In some embodiments, the lever is configured to non-rotatably couple to the shovel at the pivot point in a third orientation in which the elongate lever arm extends in a proximal direction such that the elongate lever arm extends proximal of the shovel, wherein the apparatus in the third orientation is configured to be used as a shovel.

In some embodiments, the first end of the elongate lever arm is disposed closer to the distal end of the elongate shovel arm in the second orientation than in the first orientation.

In some embodiments, the apparatus for filling a bag is configured to be inserted into a bag and facilitate insertion of fill material into the bag when the apparatus is in the first orientation, to be stored in the second orientation, and to increase a distance between the first end of the elongate lever arm and the distal end of the shovel arm relative to the first and second orientations when the apparatus is in the third orientation, wherein the lever handle and the shovel handle are configured to be grasped by a user from outside of the bag when the apparatus is in the first orientation and disposed within the bag.

In some embodiments, the elongate shovel arm includes a proximal portion, a center portion, and a distal portion, wherein the proximal portion is disposed at a proximal end of the center portion and the distal portion is disposed at a distal end of the center portion, the center portion extending between the distal portion and the proximal portion, wherein a longitudinal axis of the center portion is disposed at a first angle to a longitudinal axis of the distal portion and is disposed at a second angle to a longitudinal axis of the proximal portion.

In some embodiments, the longitudinal axis of the distal portion is parallel to the longitudinal axis of the proximal portion, such that the first angle and the second angle are identical.

In some embodiments, the elongate lever arm includes a proximal portion, an angled portion, and a distal portion, wherein the proximal portion is disposed at a proximal end of the angled portion and the distal portion is disposed at a distal end of the angle portion, the angled portion extending between the distal portion and the proximal portion, wherein a longitudinal axis of the angled portion is disposed at a first angle to a longitudinal axis of the distal portion and is disposed at a second angle to a longitudinal axis of the proximal portion.

In some embodiments, the longitudinal axis of the distal portion is parallel to the longitudinal axis of the proximal portion, such that the first angle and the second angle are identical.

In some embodiments, the shovel arm and the elongate lever arm are configured to couple to one another via a pin assembly.

In some embodiments, the pin assembly comprises three pins that extend from the elongate shovel arm and three holes disposed adjacent a second end of the elongate lever arm.

In some embodiments, the three pins comprise two outer pins and a center pin disposed between the two outer pins.

In some embodiments, the apparatus for filling a bag is configured to transition between the first orientation, the second orientation, and the third orientation by altering (1) the arrangement of the elongate shovel arm with respect to the elongate lever arm and (2) interaction of the three pins and three holes.

In some embodiments, transitioning from the first orientation to the second orientation comprises uncoupling the elongate lever arm from the center pin, rotating the elongate lever arm such that the first end of the elongate lever arm extends closer toward the distal end of the shovel arm than in the first orientation, and coupling the elongate lever arm to the elongate shovel arm such that two of the three holes are disposed around two of the three pins.

In some embodiments, transitioning from the first orientation to the second orientation comprises uncoupling the elongate lever arm from a center pin, rotating the elongate lever arm such that the first end of the elongate lever arm extends closer toward the distal end of the elongate shovel arm than in the first orientation, and coupling the elongate lever arm to the elongate shovel arm such that two of the three holes are disposed around two of the three pins.

In some embodiments, transitioning from the second orientation to the third orientation comprises uncoupling the elongate lever arm from two of the three pins, rotating the elongate lever arm such that the first end of the elongate lever arm extends proximally from the second end of the elongate lever arm, and coupling the elongate lever arm to the elongate shovel arm such that each of the three holes disposed adjacent the second end of the elongate lever arm is disposed around one of the three pins.

In some embodiments, transitioning from the first orientation to the third orientation comprises uncoupling the elongate lever arm from the center pin, rotating the elongate lever arm such that the first end of the elongate lever arm extends proximally from the second end of the elongate lever arm, and coupling the elongate lever arm to the elongate shovel arm such that each of the three holes disposed adjacent the second end of the elongate lever arm is disposed around one of the three pins.

In some embodiments, the two outer pins comprise a proximal outer pin and a distal outer pin that limit a rotational range of the about which the elongate lever arm may rotatably pivot when the apparatus is in the first orientation, the proximal outer pin comprising an upper stop configured to limit the rotational range of the elongate lever arm when the elongate lever arm rotates in a direction away from the shovel arm to the operable configuration, the distal outer pin comprising a lower stop configured to limit the rotational range of the elongate lever arm when the elongate lever arm rotates in a direction toward the shovel to the insertion configuration.

In some embodiments, the apparatus for filling a bag is configured to transition between the first orientation, the second orientation, and the third orientation by altering the arrangement of the elongate shovel arm with respect to the elongate lever arm.

In some embodiments, an apparatus for filling a bag comprises a shovel, a lever, and one or more coupling elements. In some embodiments, the shovel comprises an elongate shovel arm, a shovel mouth, a shovel handle, an elongate lever arm, and a lever handle. The elongate shovel arm may comprise a proximal portion and a distal portion. The shovel mouth may also be configured to couple to the shovel arm adjacent a distal end of the shovel arm, the shovel mouth configured to collect and direct fill material. The shovel handle may be configured to couple to the shovel arm adjacent a proximal end of the shovel arm. The lever may include an elongate lever arm and a lever handle. The elongate lever arm may include a first end and a second end. The lever handle may be disposed at a first end of the elongate lever arm. The one or more coupling elements may be configured to facilitate coupling of the elongate lever arm to the elongate shovel arm, the one or more coupling elements disposed at the second end of the elongate lever arm and at the proximal end of the elongate shovel arm. The apparatus for filling a bag may be configured to transition between a pivoting orientation and a storage orientation. The elongate lever arm, when the bagging apparatus is in the pivoting orientation, may both extend in a generally distal direction from a pivot and be rotatably coupled to the elongate shovel arm at one or more coupling elements to rotate about the pivot. The elongate lever arm, when the bagging apparatus is in the storage orientation, may be non-rotatably coupled to the elongate shovel and extend from the one or more coupling elements in a generally distal direction.

In some embodiments, the apparatus for filling a bag is configured to transition between the pivoting orientation, the storage orientation, and a shovel orientation. The elongate lever arm, when the bagging apparatus is in the shovel orientation, may be non-rotatably coupled to the elongate shovel and extend in a generally proximal direction from the one or more coupling elements.

In some embodiments, the shovel arm, shovel mouth, and shovel handle are integrally formed.

In some embodiments, the first end of the elongate lever arm is disposed closer to the distal end of the elongate shovel arm in the storage orientation than in the bagging orientation.

In some embodiments, the one or more coupling elements comprises an upper stop and a lower stop that are each configured to limit the rotational range of the elongate lever arm when the apparatus is in the pivoting orientation, wherein the upper stop and the lower stop are disposed adjacent to the pivot.

In some embodiments, the upper stop and lower stop each comprise a pin that extends from the elongate shovel arm.

In some embodiments, the apparatus, when in the pivoting orientation, is configured to facilitate filling of a bag. The apparatus, when in an insertion configuration, may be configured to be positioned with the shovel mouth at the opening of the bag, within the bag, and adjacent a first side of the opening of the bag. The elongate lever arm of the apparatus is configured to be rotated about the pivot from the insertion configuration to an operable configuration to create a gap between the shovel mouth and the lever handle to hold the bag open during filling. The lever handle may be configured to be grasped adjacent a second side of the opening of the bag that is opposite the first side of the opening to scoop the shovel mouth into fill material, the shovel mouth directing fill material into the bag and allowing the fill material to pass into and at least partially fill the bag.

In some embodiments, scooping the shovel mouth into the fill material to fill the bag comprises at least partially filling the bag without raising any fill material to a height above the opening of the bag.

As can be appreciated, other embodiments of the invention are possible. Although the description above contains much specificity, these should not be construed as limiting the scope of the invention, but as merely providing illustrations of some of the presently preferred embodiments of this invention. The disclosure contemplates that various combinations or sub-combinations of the specific features and aspects of the embodiments may be made and still fall within the scope of the present disclosure. Various features and aspects of the disclosed embodiments can be combined with or substituted for one another in order to form varying modes of the disclosed embodiments of the invention. Those having skill in the art will appreciate that many changes may be made to the details of the above-described embodiments without departing from the underlying principles of the invention. Thus, the scope of the present invention herein disclosed should not be limited by the particular disclosed embodiments described above.

Where a range of values is provided, it is understood that each intervening value, to the tenth of the unit of the lower limit unless the context clearly dictates otherwise, between the upper and lower limit of that range and any other stated or intervening value in that stated range is encompassed within the embodiments of the invention. The upper and lower limits of these smaller ranges which may independently be included in the smaller ranges are also encompassed within the embodiments disclosed, subject to any specifically excluded limit in the stated range. Where the stated range includes one or both of the limits, ranges excluding either or both of those included limits are also included in the embodiments of the invention.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of ordinary skill with the benefit of this disclosure that in the above description of embodiments various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. The scope of the present invention should, therefore, be determined only by the following claims.

What is claimed is:

1. An apparatus for filling a bag, the apparatus comprising:
   a shovel including an elongate shovel arm, a shovel mouth disposed at a distal end of the elongate shovel arm, and a shovel handle disposed at a proximal end of the elongate shovel arm,
   a lever including an elongate lever arm and a lever handle that is disposed at a first end of the elongate lever arm, the elongate lever arm configured to couple to the elongate shovel arm at a pivot point, wherein the lever configured to:
rotatably couple to the shovel at the pivot point in a first orientation in which the elongate lever arm is rotatable about the pivot point between an operable configuration and an insertion configuration and the elongate lever arm extends from the pivot point in a distal direction and at an angle to the shovel arm; and
non-rotatably couple to the shovel at the pivot point in a second orientation in which the elongate lever arm extends in a distal direction toward the shovel mouth,
wherein the apparatus is configured to be inserted into a bag and facilitate insertion of fill material into the bag when the apparatus is in the first orientation, to be stored in the second orientation, and to increase a distance between the first end of the elongate lever arm and the distal end of the shovel arm relative to the first and second orientations when the apparatus is in the third orientation; and
wherein the lever handle and the shovel handle are configured to be grasped by a user from outside of the bag when the apparatus is in the first orientation and disposed within the bag.

2. The apparatus of claim 1, wherein the lever is configured to non-rotatably couple to the shovel at the pivot point in a third orientation in which the elongate lever arm extends in a proximal direction such that the elongate lever arm extends proximal of the shovel, wherein the apparatus in the third orientation is configured to be used as a shovel.

3. The apparatus of claim 1, wherein the elongate shovel arm includes a proximal portion, a center portion, and a distal portion,
wherein the proximal portion is disposed at a proximal end of the center portion and the distal portion is disposed at a distal end of the center portion, the center portion extending between the distal portion and the proximal portion,
wherein a longitudinal axis of the center portion is disposed at a first angle to a longitudinal axis of the distal portion and is disposed at a second angle to a longitudinal axis of the proximal portion.

4. The apparatus of claim 3, wherein the longitudinal axis of the distal portion is parallel to the longitudinal axis of the proximal portion, such that the first angle and the second angle are identical.

5. The apparatus of claim 1, wherein the elongate lever arm includes a proximal portion, an angled portion, and a distal portion,
wherein the proximal portion is disposed at a proximal end of the angled portion and the distal portion is disposed at a distal end of the angle portion, the angled portion extending between the distal portion and the proximal portion,
wherein a longitudinal axis of the angled portion is disposed at a first angle to a longitudinal axis of the distal portion and is disposed at a second angle to a longitudinal axis of the proximal portion.

6. The apparatus of claim 1, wherein the shovel arm and the elongate lever arm are configured to couple to one another via a pin assembly.

7. The apparatus of claim 6, wherein the pin assembly comprises three pins that extend from the elongate shovel arm and three holes disposed adjacent a second end of the elongate lever arm.

8. The apparatus of claim 7, wherein the three pins comprise two outer pins and a center pin disposed between the two outer pins.

9. The apparatus of claim 8, wherein the two outer pins comprise a proximal outer pin and a distal outer pin that limit a rotational range of the about which the elongate lever arm may rotatably pivot when the apparatus is in the first orientation, the proximal outer pin comprising an upper stop configured to limit the rotational range of the elongate lever arm when the elongate lever arm rotates in a direction away from the shovel arm to the operable configuration, the distal outer pin comprising a lower stop configured to limit the rotational range of the elongate lever arm when the elongate lever arm rotates in a direction toward the shovel to the insertion configuration.

10. The apparatus of claim 7, wherein the apparatus is configured to transition between the first orientation, the second orientation, and the third orientation by altering the arrangement of the elongate shovel arm with respect to the elongate lever arm and interaction of the three pins and three holes.

11. The apparatus of claim 9, wherein transitioning from the first orientation to the second orientation comprises uncoupling the elongate lever arm from the center pin, rotating the elongate lever arm such that the first end of the elongate lever arm extends closer toward the distal end of the shovel arm than in the first orientation, and coupling the elongate lever arm to the elongate shovel arm such that two of the three holes are disposed around two of the three pins.

12. The apparatus of claim 9, wherein transitioning from the first orientation to the second orientation comprises uncoupling the elongate lever arm from a center pin, rotating the elongate lever arm such that the first end of the elongate lever arm extends closer toward the distal end of the elongate shovel arm than in the first orientation, and coupling the elongate lever arm to the elongate shovel arm such that two of the three holes are disposed around two of the three pins.

13. The apparatus of claim 9, wherein transitioning from the second orientation to the third orientation comprises uncoupling the elongate lever arm from two of the three pins, rotating the elongate lever arm such that the first end of the elongate lever arm extends proximally from the second end of the elongate lever arm, and coupling the elongate lever arm to the elongate shovel arm such that each of the three holes disposed adjacent the second end of the elongate lever arm is disposed around one of the three pins.

14. The apparatus of claim 9, wherein transitioning from the first orientation to the third orientation comprises uncoupling the elongate lever arm from the center pin, rotating the elongate lever arm such that the first end of the elongate lever arm extends proximally from the second end of the elongate lever arm, and coupling the elongate lever arm to the elongate shovel arm such that each of the three holes disposed adjacent the second end of the elongate lever arm is disposed around one of the three pins.

15. The apparatus of claim 1, wherein the apparatus is configured to transition between the first orientation, the second orientation, and the third orientation by altering the arrangement of the elongate shovel arm with respect to the elongate lever arm.

16. An apparatus for filling a bag, the apparatus comprising:
a shovel comprising:
an elongate shovel arm comprising a proximal portion and a distal portion;

a shovel mouth configured to couple to the shovel arm adjacent a distal end of the shovel arm, the shovel mouth configured to collect and direct fill material; and a shovel handle configured to couple to the shovel arm adjacent a proximal end of the shovel arm;

a lever comprising:

an elongate lever arm including a first end and a second end; and a lever handle disposed at a first end of the elongate lever arm; and one or more coupling elements configured to facilitate coupling of the elongate lever arm to the elongate shovel arm, the one or more coupling elements disposed at the second end of the elongate lever arm and at the proximal end of the elongate shovel arm;

wherein the apparatus is configured to transition between a pivoting orientation and a storage orientation;

wherein the elongate lever arm, when the apparatus is in the pivoting orientation, both extends in a generally distal direction from a pivot and is rotatably coupled to the elongate shovel arm at one or more coupling elements to rotate about the pivot;

wherein the elongate lever arm, when the apparatus is in the storage orientation, is non-rotatably coupled to the elongate shovel and extends from the one or more coupling elements in a generally distal direction.

17. The apparatus of claim 16, wherein the apparatus is further configured to transition between the pivoting orientation, the storage orientation, and a shovel orientation, wherein the elongate lever arm, when the apparatus is in the shovel orientation, is non-rotatably coupled to the elongate shovel and extends in a generally proximal direction from the one or more coupling elements.

18. The apparatus of claim 16, wherein the one or more coupling elements comprises an upper stop and a lower stop that are each configured to limit the rotational range of the elongate lever arm when the apparatus is in the pivoting orientation, wherein the upper stop and the lower stop are disposed adjacent to the pivot.

19. The apparatus of claim 16, wherein, the apparatus, when in the pivoting orientation, is configured to facilitate filling of a bag, wherein:

the apparatus, when in an insertion configuration, is configured to be positioned with the shovel mouth at the opening of the bag, within the bag, and adjacent a first side of the opening of the bag;

wherein the elongate lever arm of the apparatus is configured to be rotated about the pivot from the insertion configuration to an operable configuration to create a gap between the shovel mouth and the lever handle to hold the bag open during filling;

wherein the lever handle is configured to be grasped adjacent a second side of the opening of the bag that is opposite the first side of the opening to scoop the shovel mouth into fill material, the shovel mouth directing fill material into the bag and allowing the fill material to pass into and at least partially fill the bag.

* * * * *